United States Patent
Roy-Faderman

(10) Patent No.: US 10,503,707 B2
(45) Date of Patent: Dec. 10, 2019

(54) FIELD TYPES DEFINED VIA CUSTOM METADATA TYPES

(71) Applicant: salesforce.com, inc., San Francisco, CA (US)

(72) Inventor: Avrom Irwin Roy-Faderman, Sunnyvale, CA (US)

(73) Assignee: salesforce.com, inc., San Francisco, CA (US)

(*) Notice: Subject to any disclaimer, the term of this patent is extended or adjusted under 35 U.S.C. 154(b) by 526 days.

(21) Appl. No.: 15/200,708

(22) Filed: Jul. 1, 2016

(65) Prior Publication Data
US 2018/0004778 A1    Jan. 4, 2018

(51) Int. Cl.
 *G06F 16/20*  (2019.01)
 *G06F 16/21*  (2019.01)
 *G06F 16/22*  (2019.01)
 *G06F 16/245* (2019.01)
 *G06F 16/25*  (2019.01)

(52) U.S. Cl.
CPC ......... *G06F 16/211* (2019.01); *G06F 16/221* (2019.01); *G06F 16/2291* (2019.01); *G06F 16/245* (2019.01); *G06F 16/252* (2019.01)

(58) Field of Classification Search
CPC ........................ G06F 17/30292; G06F 17/30
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

*Primary Examiner* — Kristopher Andersen
(74) *Attorney, Agent, or Firm* — Elliot, Ostrander & Preston, P.C.

(57) ABSTRACT

In accordance with disclosed embodiments, there are provided systems, methods, and apparatuses for implementing field types which are defined via custom metadata types within a computing environment. An exemplary system may include, for example: means for operating a database system within the computing architecture to store a plurality of objects; creating a custom metadata type by specifying at least (i) a name for the custom metadata type, (ii) one or more fields to contain configuration information for the custom metadata type, and (iii) at least one relationship field having fields as its domain relating the custom metadata type to a column or field of an object stored in the database system; creating a custom datatype by specifying at least (i) a name for the custom datatype, (ii) a base datatype available from the database system, and (iii) the custom metadata type; executing application code at the computing architecture, wherein the application code evaluates one or more objects referenced by the application code to identify one or more fields of the objects to identify a field of an object expressly declared as having a datatype corresponding to the custom datatype; and retrieving, via the application code, the configuration information for use by the application code. Other related embodiments are disclosed.

24 Claims, 11 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 9,047,070 B2 | 6/2015 | Roy-Faderman |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2015/0317350 A1* | 11/2015 | Roy-Faderman .......... G06F 16/2365 707/702 |

* cited by examiner

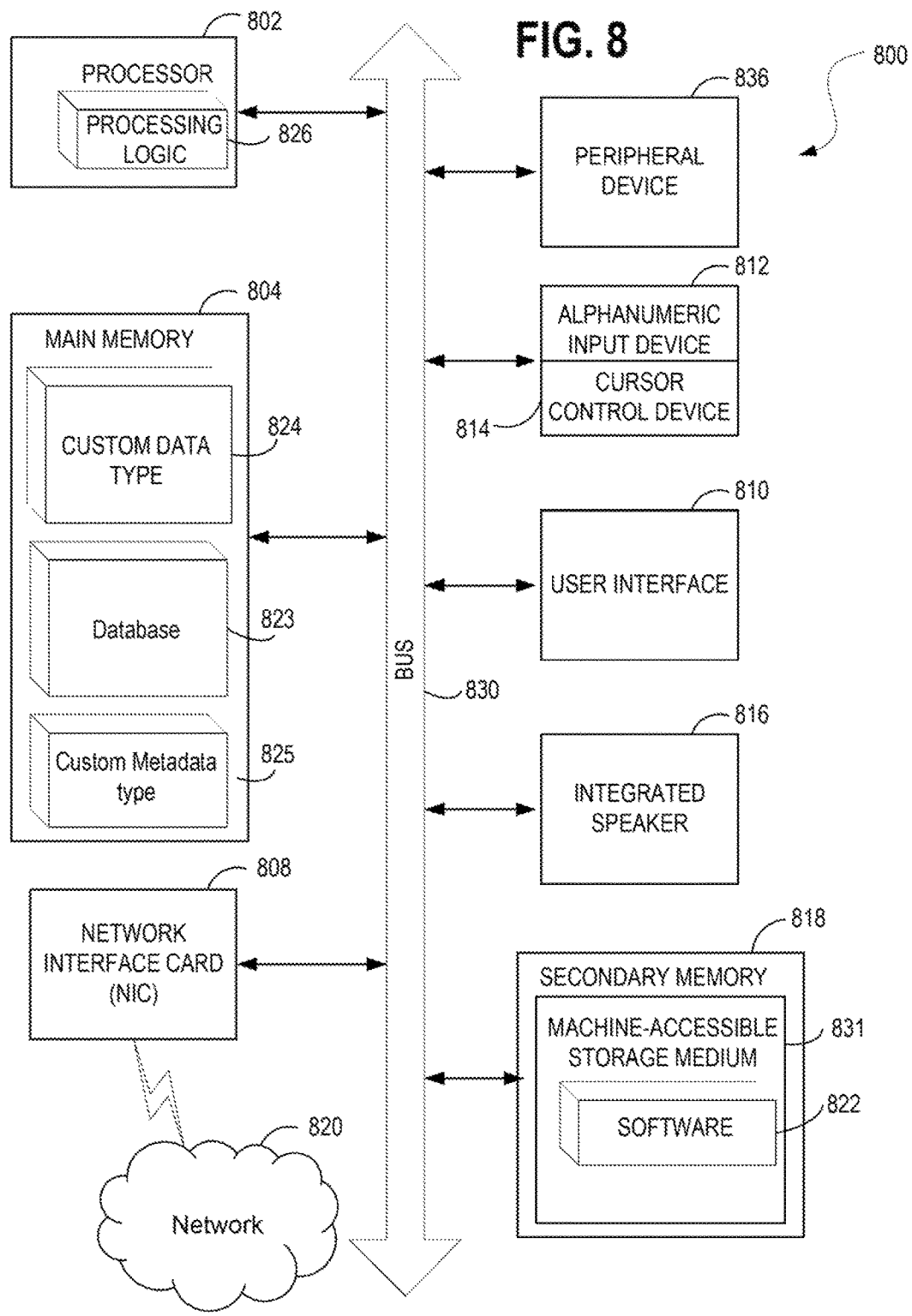

FIELD TYPES DEFINED VIA CUSTOM METADATA TYPES

CLAIM OF PRIORITY

None.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to systems, methods, and apparatuses for implementing field types which are defined via custom metadata types within a computing environment such as a database system implementation supported by a processor and a memory to execute such functionality. Such means may be implemented within the computing architecture of a hosted computing environment, such as an on-demand or cloud computing environment which utilizes multi-tenant database technologies, client-server technologies, traditional database technologies, or other computing architecture in support of the hosted computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

In a hosted computing environment there exists a wide array of customers which may utilize a database provided by the hosted computing environment. Because there is a wide array of customers, there is also a wide array of needs which must be satisfied for those customers if the hosted computing environment is to be economically viable. That is to say, the database system provided to and made accessible for the wide array of customers may provide sufficient functionality and capability to satisfy those customers' needs.

Conventional database systems provide a variety of types for the columns of the database system. In computer science and computer programming, a datatype or simply a "type" is a classification identifying one of various types of data, such as real, integer or Boolean, which determines the possible values for that type, permissible operations that can be done on values of that type, the meaning of the data for a given type, and the manner by which values of a given type are stored. Common datatypes include: integers, booleans, characters, floating-point numbers, and alphanumeric strings.

As used herein, the terms "fields" and "field types" and "column types" and "database columns" may be used interchangeably as they each refer to the same thing, specifically, the defined classification identifying one of various types of data for the column and its fields, regardless of whether it is a custom defined or a pre-existing defined datatype.

Prior systems permitted users of database systems to specify lists of other column types, resulting in a compound of column types, however, there are presently no means by which users of a database system may permissibly specify their own field types for columns of a database system in which the field types are defined via custom metadata types.

Notwithstanding the lack of such functionality, customers may nevertheless desire to specify their own type for columns in a different way than presently available and pre-existing defined column types accessible to them, including the combination, compound, or list of pre-existing defined column types.

For instance, customers may desire to specify types that behave a different way than those pre-existing defined column types and the customers may desire for others, such as other programmers and developers having access to the database system, to be able to declare fields of their custom defined column type.

Further still, users of such a database system may wish to utilize custom defined field types in a simple declarative manner such that they may simplify the use of their custom defined field types by others and such that, when used, their custom defined field types will behave according to their own customized code in which the behavior of the custom defined field types operate according to what others, such as developers and programmers, are declaring.

The present state of the art may therefore benefit from the systems, methods, and apparatuses for implementing field types which are defined via custom metadata types within a computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 8 illustrates a diagrammatic representation of a machine in the exemplary form of a computer system, in accordance with one embodiment.

DETAILED DESCRIPTION

Figure 1:
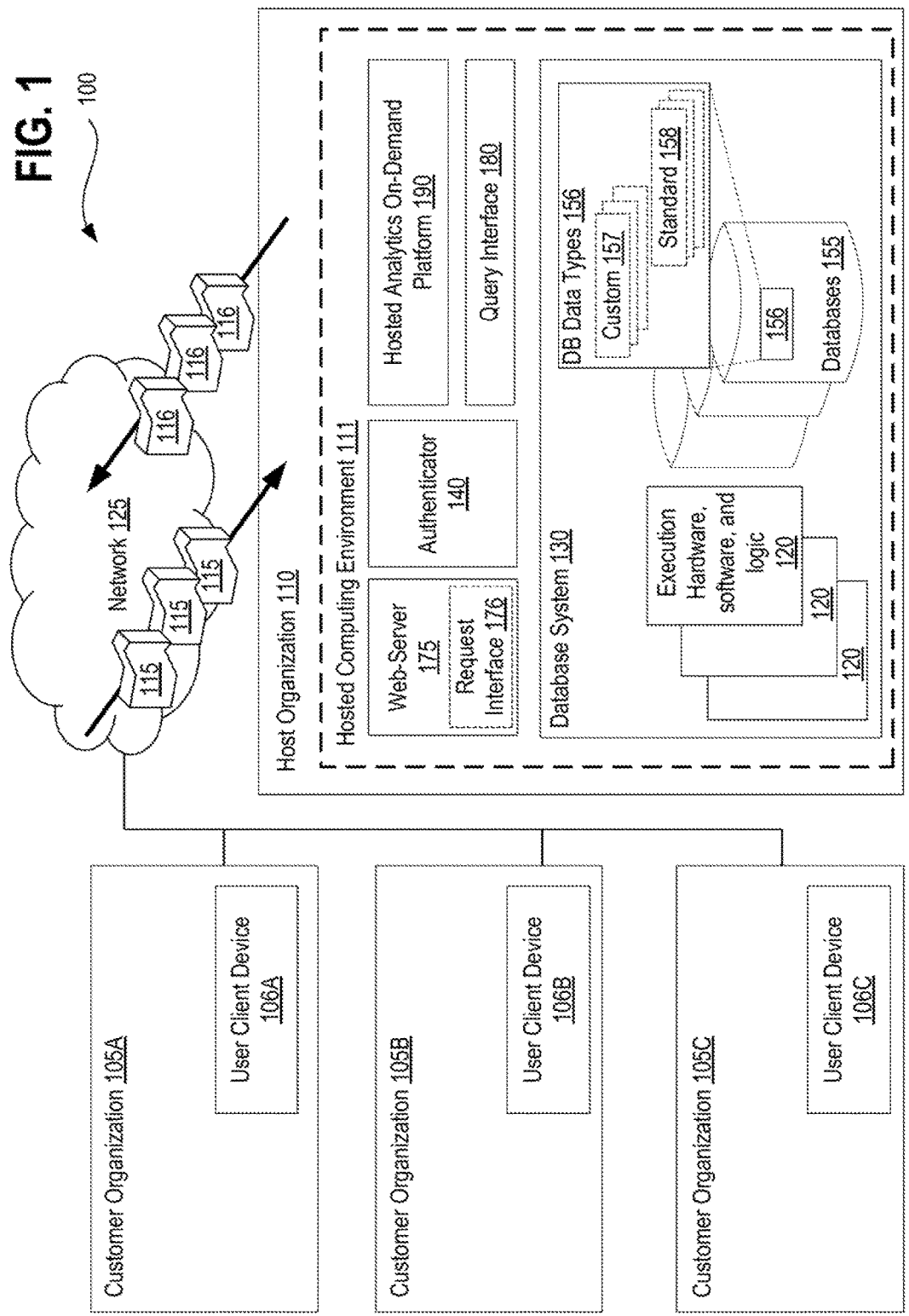
FIG. 1 depicts an exemplary architecture in accordance with described embodiments.

Described herein are systems, methods, and apparatuses for implementing field types which are defined via custom metadata types within a computing environment. An exemplary system may include, for example: means for operating a database system within the computing architecture to store a plurality of objects; creating a custom metadata type by specifying at least (i) a name for the custom metadata type, (ii) one or more fields to contain configuration information for the custom metadata type, and (iii) at least one relationship field having fields as its domain relating the custom metadata type to a column or field of an object stored in the database system; creating a custom datatype by specifying at least (i) a name for the custom datatype, (ii) a base datatype available from the database system, and (iii) the custom metadata type; executing application code at the computing architecture, in which the application code evaluates one or more objects referenced by the application code to identify one or more fields of the objects to identify a field of an object expressly declared as having a datatype corresponding to the custom datatype; and retrieving, via the application code, the configuration information for use by the application code.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155, for example, to store object data, tables, datasets, and underlying database records with user data on behalf of customer organizations 105A-C (e.g., users of such a database system 130 or tenants of a multi-tenant database type database system or the affiliated users of such a database system). In alternative embodiments, a client-server computing architecture may be utilized in place of the database system 130 or alternatively, a computing grid, or a pool of work servers, or some combination of hosted computing architectures may be utilized to carry out the computational workload and processing demanded of the host organization 110.

The database system 130 depicted in the embodiment shown includes a plurality of underlying hardware, software, and logic elements 120 that implement database functionality and a code execution environment within the host organization 110.

In accordance with one embodiment, database system 130 further implements databases 155 to service database queries and other data interactions with the databases 155. The hardware, software, and logic elements 120 of the database system 130 are separate and distinct from a plurality of customer organizations (105A, 105B, and 105C) which utilize the services provided by the host organization 110 by communicably interfacing to the host organization 110 via network 125. In such a way, host organization 110 may implement on-demand services, on-demand database services or cloud computing services to subscribing customer organizations 105A-C.

Within the databases 155 of the database system 130 there are defined a plurality of database datatypes 156 by which to declare the column types or datatypes for any given column of the databases 155. As depicted, there are two kinds of datatypes provided, custom 157 datatypes and standard 158 datatypes. Once a database datatype 156 is provided by the database system 130, it is available for use through its declaration by developers and programmers having access to the database system 130, regardless of whether the datatype declared is of a custom 157 datatype or standard 158 datatype.

For instance, as depicted here, the custom 157 datatypes are defined via custom metadata types within the hosted computing environment 111 supported by the execution hardware, software, and logic elements 120, including at least a processor and a memory to execute such functionality. As used herein, custom metadata types are used to describe the form of metadata similar to the manner in which metadata describes the form of data. Notably however, it should be understood that not all metadata is of a custom type. For instance, metadata of customer-created objects is not of a custom type. Rather, a custom object created by such a customer is metadata but it is of the standard type of that custom object.

Further depicted is the host organization 110 receiving input and other requests 115 from a plurality of customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

Customers organizations 105A-C depicted here are able to utilize the standard 158 datatypes provided by the database system 130 of the host organization 110 and are further able to utilize the custom 157 datatypes of the database system 130, regardless of whether the customer organizations 105A-C defined the custom 157 datatypes. As used herein, custom 157 datatypes are also metadata which extends the list of possible values or provides a description of the "datatype" aspect of the field's metadata. Because the standard 158 datatypes are provided by the database system 130, no customer organization 105A-C has defined any of the provided standard 158 datatypes. Conversely, it is possible that a customer organization customer organization 105A-C has both custom defined a custom 157 datatype now provided by the database system 130 and now is able to utilize the previously defined custom 157 datatype or alternatively, a given customer organization 105A-C may simply utilize a previously defined custom 157 datatype as defined and provided by another one of the customer organizations 105A-C, but made available via the database system 130.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C.

The host organization 110 additionally provides a query interface 180 capable of receiving and executing requested queries against the databases and storage components of the database system 130 so as to return a result set, response, or other requested data in furtherance of the methodologies described. Query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Authenticator 140 operates on behalf of the host organization to verify, authenticate, and otherwise credential users attempting to gain access to the host organization.

Figure 2A:
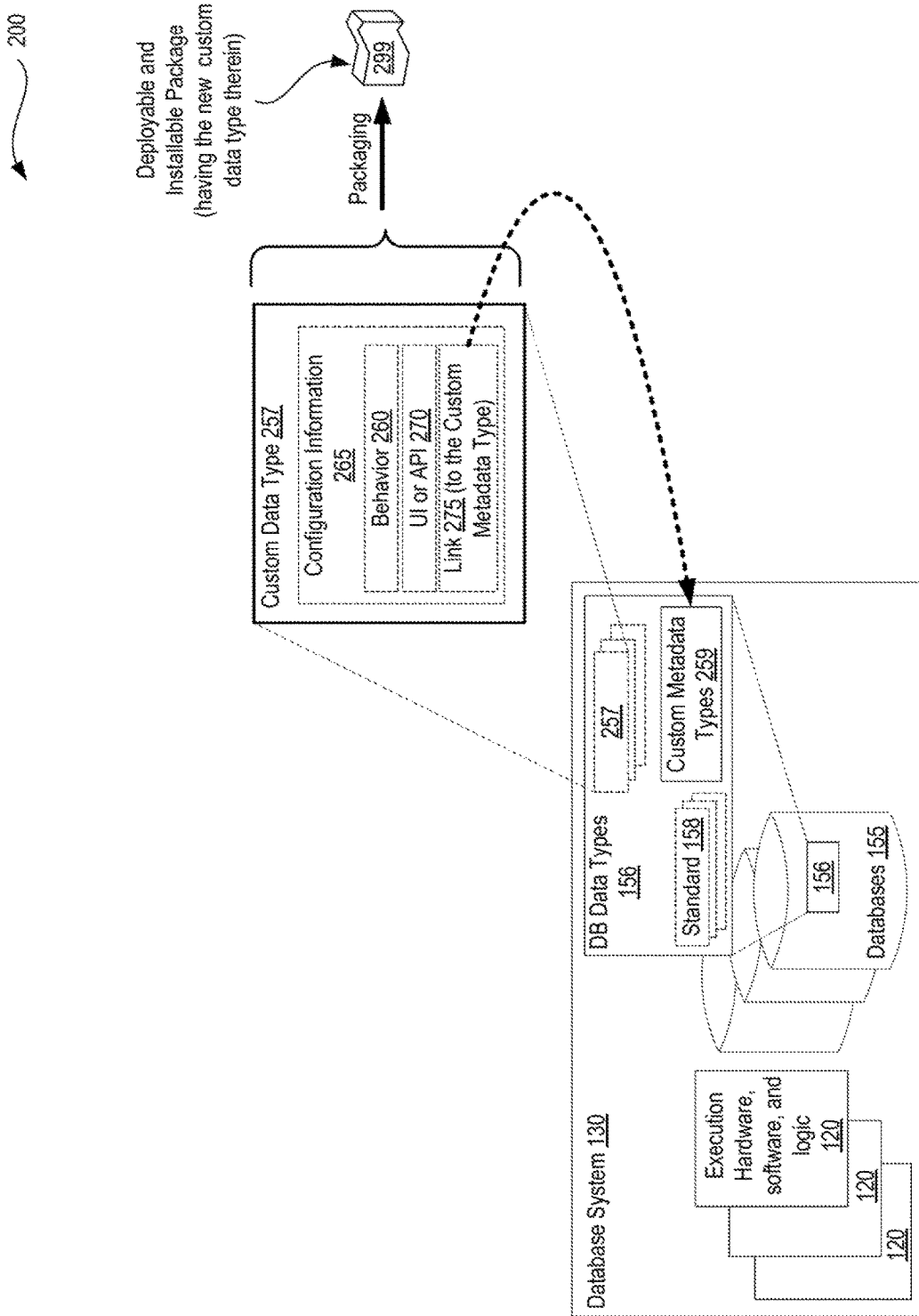
FIGS. 2A and 2B depict additional exemplary architectures in accordance with the described embodiments.
Figure 2B:
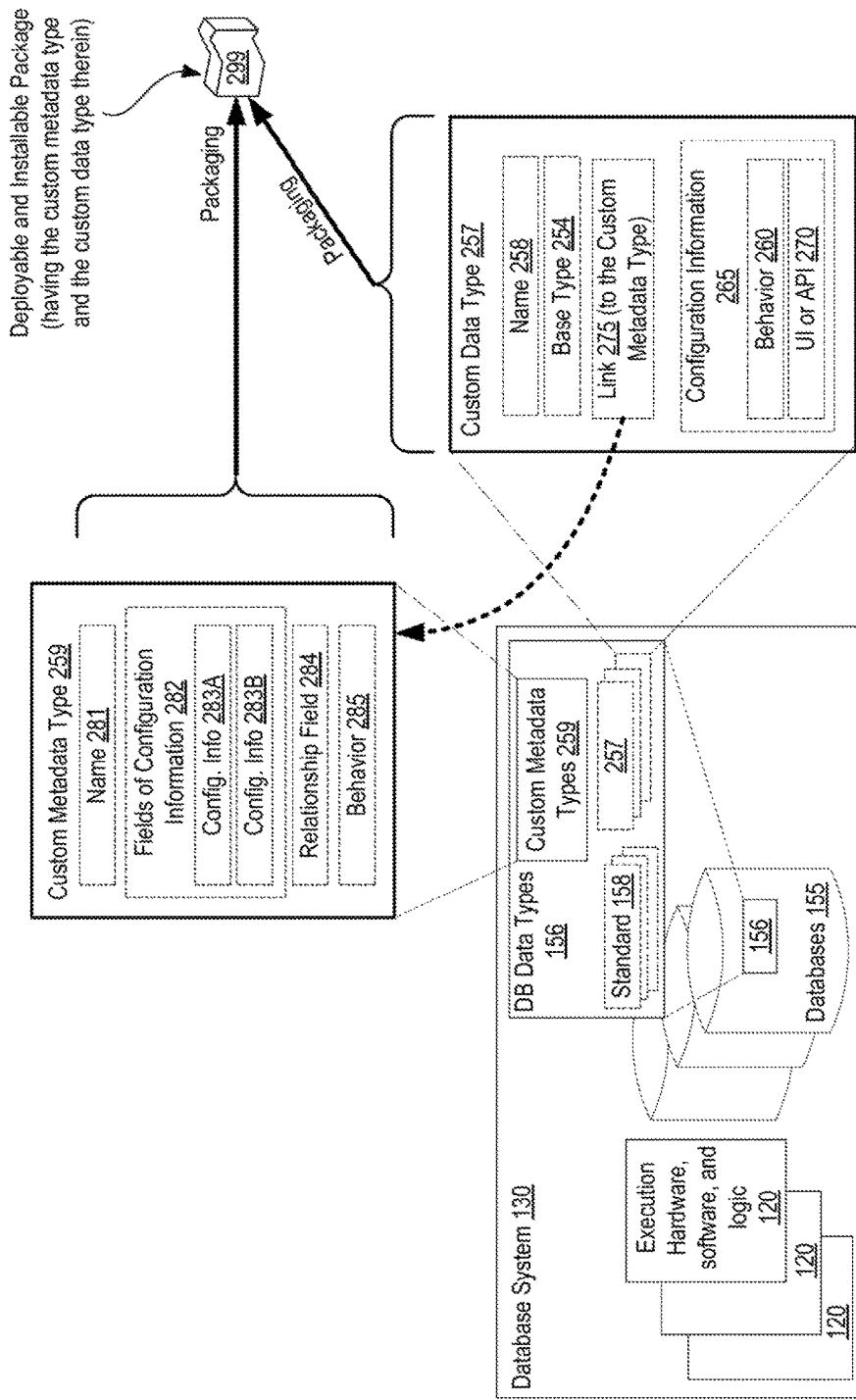

FIGS. 2A and 2B depict additional exemplary architectures 200 and 201 in accordance with the described embodiments. In particular, at FIG. 2A, there is depicted the Database system 130 having therein execution hardware, software, and logic elements 120 in support of the databases 155. Within the Databases 155 there are provided database datatypes 156 including custom datatypes 257 and standard datatypes 158. Additionally depicted in greater detail is the custom datatype 257 which defines at least a behavior 260 and is supported by custom metadata types 259.

Through the use of the custom datatype 257, a customer organization is able to provide their own code within behavior 260 for the custom datatype 257 and specify that customized code for use when the custom datatype 257 is declared such that the customer organization is able to define and determine the behavior based on what other developers subsequently declare.

Prior solutions required that custom fields be created as a compound of other pre-defined and pre-existing datatypes, in which a customer creating a custom field was limited to creating a custom field which equated to a list of two or more other pre-specified datatypes determined to be acceptable by the host organization 110. In such a way, it is possible to group previously available and pre-defined datatypes together to make a new "custom" datatype which is custom insomuch that the list of pre-defined datatypes may not previously exist for that customer, but in effect, it is simply a list of already available datatypes provided by the database system 130 of the host organization, albeit within a new compound datatype which is more useful to the customer organization. Such an approach has significant advantage for the customer organizations and permits greater flexibility in their use of the hosted computing platform and database system 130, however, it also has its limitations.

Conversely, the implementation of custom field types which are defined via custom metadata types is fundamentally distinct insomuch that when creating a new custom datatype 257 there are minimal requirements to conform to a pre-existing datatype. For instance, it is sufficient according to described embodiments to merely declare the base datatype presently available from the database system such as a "string," and yet provide behavior and functionality beyond that declared type which does not originate with the declared base datatype. Rather, when a customer organization, programmer, user, developer, or other entity having access to the database system 130 specifies a new custom datatype 257, configuration information 265 is further provided, which may be entirely arbitrary and customizable based on the creator's needs for the new custom datatype 257, without limitation to configuration information provided for the customer as was required with other pre-existing standard 158 datatypes already provided by the database system 130.

Further specified via the configuration information 265 of the new custom datatype 257 is behavior 260 information for the custom datatype 257. Take for example a datatype called a "roll-up summary" datatype field. With such a "roll-up summary" datatype field, given two objects having a master-to-detail relationship between them, it is possible to include a roll-up summary field with the master object that causes as a standard behavior, the master object to update with the sum or max or min or average values, according to the specification, for all the values of the fields within the details object. This behavior is permissible where there is a master-detail relationship between two objects, however, a different customer organization may require for their needs behavior and configuration for a new custom datatype 257 which is distinct from the above described exemplary datatype which may already exist within and be provided by the database system 130.

Therefore, a second customer organization may create an entirely new custom datatype 257, having its own configuration information 265 and behavior, without being restrained by the functionality, configuration, and behavior of another datatype, custom or not, which fails to fully accommodate their precise needs.

Composition and weak association relationships are available as industry standard datatypes, sometimes referred to as "master-detail" and "lookup" relationships respectively. A non-standard datatype provided by some on-demand cloud base service providers such as salesforce.com further include a "rollup summary over composition" which has within it standard metadata of fields of this type to specify a composition, an operation (e.g., such as "maximum" or "sum" operations), and a field on the composed object to provide the summarization. In such a way, system finds the maximum value or sum of the values as specified by the operation of the summarized field in the child object and the rollup summary over composition field then stores and maintains that value.

With the new custom datatype it is possible for a customer or user to create non-standardized datatypes which are not available generally and which are not otherwise available from their on-demand cloud services provider. For instance, a user could create a "rollup summary over weak association" to operate in a manner similar to the standard "rollup summary over composition" already provided, but for which only a weak association field is required pursuant to the new custom data type created, rather than a composition field as is the case with the provided field.

For instance, in such an example, anyone having declared the new custom datatype 257 for a "roll-up over look-up" column must then configure the object in accordance with the creator's specification and configuration information 265 of the new custom datatype 257 specifically defining relationship the object is to go over and the operation to be used. A user having declared the new custom datatype 257, for instance, may need to specify how to filter out the children objects.

In accordance with such an embodiment, there is code that executes every time an object containing a field that has been declared with the exemplary new custom datatype 257 is saved. According to such an embodiment, any child of such an object is then caused to recalculate their roll-up summary on the parent object having been declared as the new custom datatype 257. In order to recalculate their roll-up summary on the parent it is necessary to read the configuration information 265 defined for the parent such that the objects execute the correct behavior 260 as defined by the new custom datatype 257.

Many other possible custom datatypes 257 are permissible, and the above description is merely an example of one way that such a new custom datatype 257 may be created by a customer organization such that it is then provided from within the database system 130 of a host organization and declarable and usable by others.

In accordance with a particular embodiment, a custom metadata type 259 is defined. The custom metadata type 259 is similar to a custom object, but rather than the object having business data, the custom metadata type 259 includes records which provide set-up data. For instance, the custom metadata type 259 may provide the configuration information 265 for a new custom datatype 257 as set-up information within the records of a custom object. According to one embodiment, a relationship field is defined within the custom metadata type 259 object which causes an object to point to another object to establish a relationship on setup; or causes an object on setup to point to custom object definitions rather than the records of that custom object to which it points, or causes an object on setup to point to a standard object's definitions.

Consider the following exemplary operations: First, a custom metadata type is declared. Second, a relationship field on the custom metadata type, with "field definition" as its domain, is declared. Third, the custom datatype is declared resulting in an association between the custom datatype and the relationship field established in the second operation. Fourth, a regular custom object is declared or alternatively an existing standard or custom object may be utilized instead for subsequent operations. Fifth, a new custom field is declared on the object which was declared at the fourth operation. Sixth, a user specifies that the custom field in the fifth operation is the datatype as declared in the third operation. The sixth operation with the user specifying the custom field triggers a request for the information required to create a record of the custom metadata type declared in the first operation and a request for the value for the relationship field which was declared in the second operation and for that record created in the sixth operation will be the newly created custom field.

When a user of the database system 130 creates a new field and declares the earlier created new custom datatype 257, they declare it and give it a name and then the newly declared object is configured with the metadata relationship.

In such a way, whenever a user creates a new field and declares that field using the earlier created new custom datatype 257, the newly created object automatically requests information and further checks the new custom datatype 257 to find related custom metadata type 259. Next, from the custom metadata type 259, the fields of configuration information 282 is retrieved and the values for those fields are requested from the user. Lastly, the system finalizes creation of the field and creates a new piece of metadata of the custom metadata type 259, populating the relationship field 284 populated with a pointer to the newly created custom field.

Once a new custom datatype 257 is created, the same developer or another developer, programmer, administrator, or other user having access to the database system 130 that has installed the necessary components above from a package created and provided by the creator of the new custom datatype 257 may then create a new field on an object and specify the new custom datatype 257 as the datatype of the field, provided that any required field values on the custom metadata type 259 are input as required. For instance, such information may be specified and entered via the UI, API, or other automated procedure described above.

According to certain embodiments, the new custom datatype 257, once created, is provided via a deployable and installable package 299 which is available to, accessible to, and usable by other developers, administrators, programmers, and users within the same customer organization as the creator of the new custom datatype 257 with users external to the customer organization of the creator of the new custom datatype 257 lacking access. Alternatively, the new custom datatype 257, once created, is available to, accessible to, and installable and usable by other developers, administrators, programmers, and users of any customer organization having access to the database system 130 as a deployable and installable package 299 or is available to users associated with a specified list of customer organizations according to the restrictions as set forth by the creator of the new custom datatype 257 as a deployable and installable package 299.

In accordance with described embodiments, any time a developer declares a field to be of the new custom datatype 257, regardless of whether or not that developer is the creator of the new custom datatype 257 or merely a user of it, the database system 130 automatically inserts a custom metadata record, of the appropriate custom metadata type 259, with the new field as the value for the specified metadata relationship based on the link 275 from new custom datatype 257 to the custom metadata type 259.

In an alternative embodiment, the new custom datatype 257 specifies as the base type, a compound multi-column custom datatype such that more than one base type is provided for the various specified columns.

According to other embodiments, the creator of the new custom datatype 257 additionally defines functionality around the custom metadata type 259, such as by creating a loosely-coupled trigger which permits the creator of the new custom datatype 257 to specify behaviors 260 such as save behavior or specialized display behaviors, or other specialized behavior which are to occur on a specified event or condition pursuant to a field having been declared as a type corresponding to the new custom datatype 257 which defines such behaviors 260.

FIG. 2B depicts a similar but alternative embodiment of the custom metadata type 259 and the custom datatype 257. In particular, FIG. 2B depicts the custom metadata type 259 having been defined at the database system via a specified name 281, specified one or more fields 282 to store configuration information depicted as configuration information 283A and 283B, and the specified relationship field 284 which is linked to or referenced by the custom datatype 257, and optionally behavior 285 which provides functionality stored within the custom metadata type 259. Custom datatype 257 is depicted here as having a specified name 258, a specified base type 254 available from the database system, a link 275 to the custom metadata type 259, and optionally configuration information 265 which includes behavior 260 functionality stored within the custom datatype 257 and a UI or API 270 also stored within the custom datatype 257. Alternative distributions of the needed configuration information and behaviors are also permissible to suit the needs of the creator of the custom metadata type 259 and the custom datatype 257.

Similar to FIG. 2A, the custom metadata type 259 and the custom datatype 257 are packaged within a deployable and installable package 299

Figure 3:
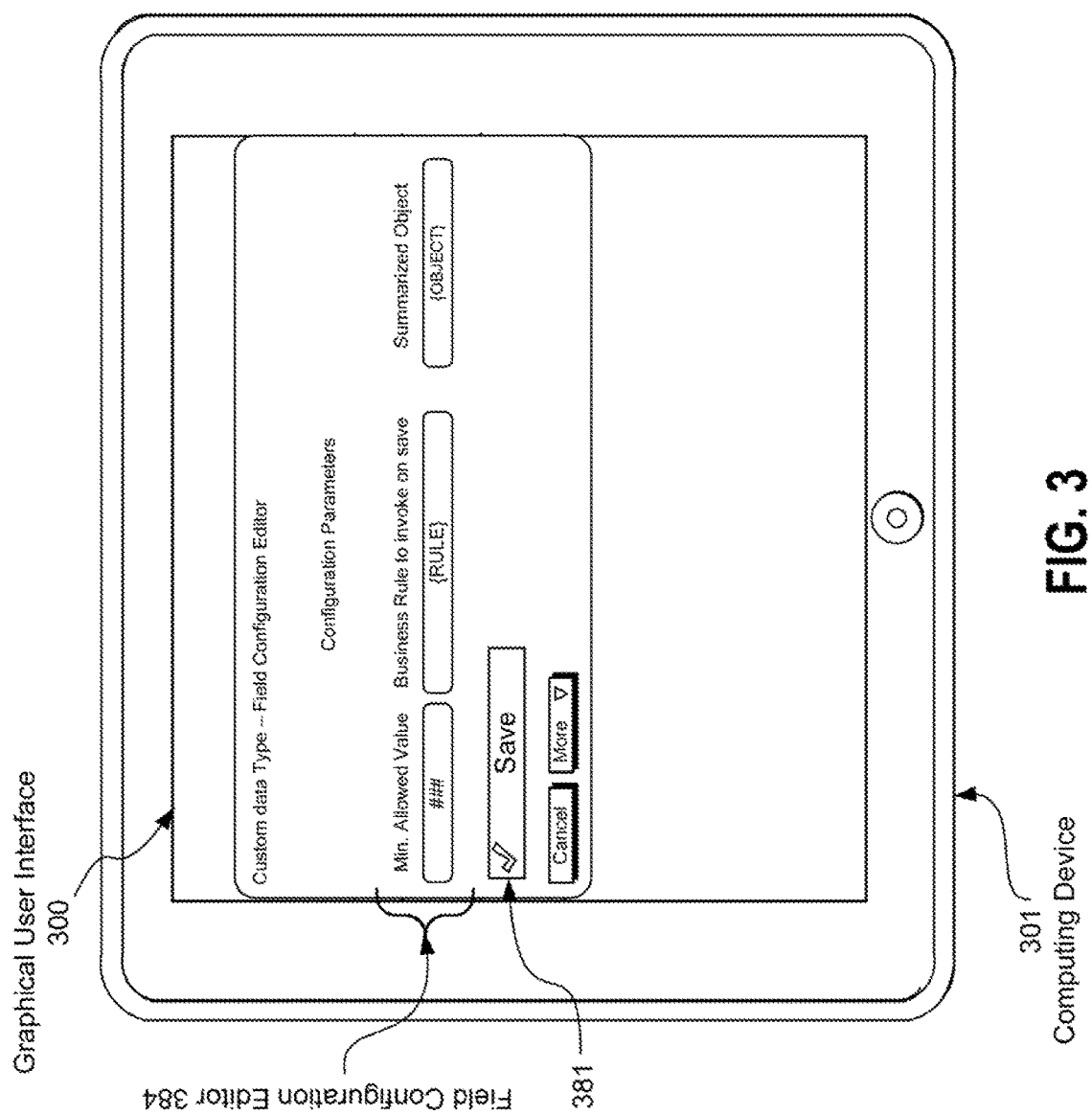
FIG. 3 depicts an exemplary graphical interface operating at a computing device such as a personal computer, a mobile, smartphone, tablet computing device, etc., in accordance with described embodiments.

FIG. 3 depicts an exemplary graphical interface 300 operating at a computing device 301 such as a personal computer, a mobile, smartphone, tablet computing device, etc., in accordance with described embodiments.

In particular, there is depicted a configuration editor 384 which provides an API or UI through which a developer having declared the new custom datatype 257 for a field is able to enter the requisite values as mandated by the configuration information of the new custom datatype 257. The UI Field Configuration Editor 384 is derived from the fields of configuration information 282, and may be provided by the creator of the database to allow for entry of the values for the fields of configuration information 282. Examples of values mandated by a custom datatype to configure a field may include, for example, "Minimum allowed value," "Business rule to invoke on save", "summarized object", and other fields meaningful to developers. While the values mandated by the configuration of the custom datatype may ultimately affect what is displayed via UI to an end-user, the UI of the configuration editor 384 is utilized to enter the configuration information mandated by the custom datatype. Such UI would likely be utilized by a developer or administrator.

As used herein, the "custom datatype configuration" is the information which defines the custom datatype itself, such as the link 275 depicted at FIG. 2B and the fields of configuration information 282 on the related custom metadata type also depicted at FIG. 2B. Subsequently there is a specifically established configuration used to declare a field as having the custom datatype including values for a particular record of the custom metadata type, but not including any business data such as end-user data including accounts and sales opportunities. Separately there is data entered by an end-user when creating a record on an object that has the field declared above, however, such data is not part of the configuration data or the specifically established configuration user to declare the field having the custom datatype.

Element 381 provides a confirmation box to save the entered information provided by the developer or user as entered into configuration editor 384.

The graphical user interface components 260 and 270 for viewing and editing the values of the field as part of the user interface for viewing, creating, and editing the records of the object may optionally be driven according to code or functionality as specified by either or both of the behavior 260 and/or the UI or API 270 as depicted at FIGS. 2A and 2B and the field configuration editor 384 may be driven based on the fields of configuration information 282 as set forth by FIG.

2B. According to certain embodiments, the graphical user interface 300 is packaged with and deployed within the deployable and installable package 299 as depicted at FIGS. 2A and 2B. In other embodiments, the optional behavior to drive the graphical user interface components 260 and 270 for viewing and editing the values of the field as part of the user interface for viewing, creating, and editing the records of the object is not included with the deployable and installable package 299 but is instead performed by a developer or administrator in a subscribing organization. Where behavior to drive the UI is provided as part of the package, the package itself does not necessarily provide the UI itself, but rather, provides code and behavior which is consumed by such a UI framework so as to provide an interface through which the administrator or developer may enter the relevant data.

For example, when a user working with a GUI creates a new field and declares its datatype as new custom datatype 257 previously created, the GUI will then automatically present the user with whatever layout, API interface, or other UI previously defined within the UI/API 270 of the new custom datatype 257 provided to populate the metadata of the custom metadata type 259 linked to the custom datatype 257.

The field relationship is pre-populated when declared as the new custom datatype 257, however, the remaining information will be entered by the user declaring the field in accordance with the provided UI or API 270 so as to configure that new field.

Figure 4:
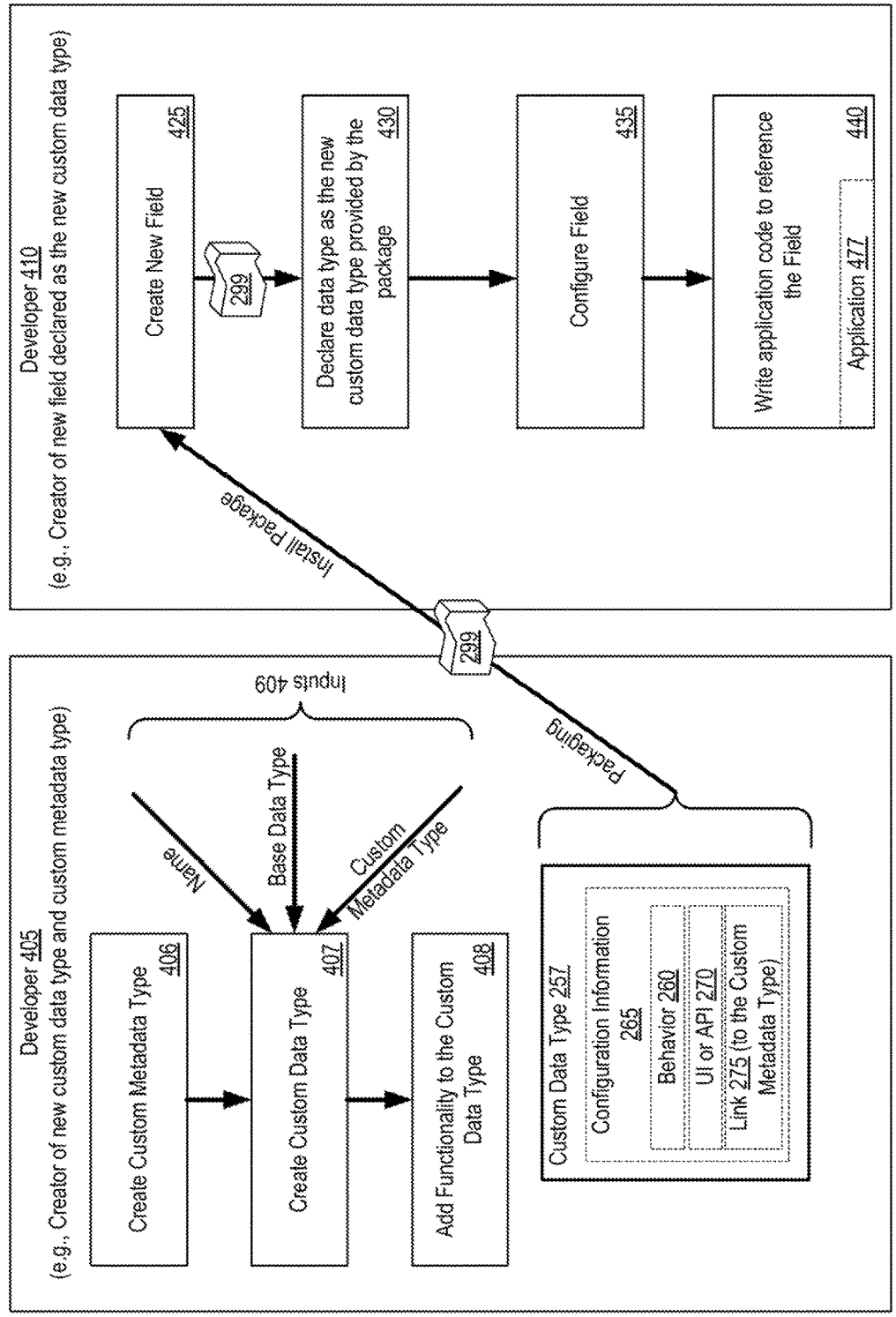
FIG. 4 describes the distinct roles and actions of each of two developers in greater detail in accordance with described embodiments.

FIG. 4 describes the distinct roles and actions of each of two developers 405 and 410 in greater detail in accordance with described embodiments. In particular, there is shown developer 405 and developer 410, two distinct and differing roles for the creation of a new custom datatype and custom metadata type by developer 405 and then for the creation of a new field declared as the new custom datatype by developer 410.

As depicted, developer 405 first creates a custom metadata type at block 406, then creates a custom datatype at block 407, providing inputs 409 for the new custom datatype which include at least a name for the new custom datatype, a base datatype, and the custom metadata type created previously. Developer 405 then adds functionality to the custom datatype at block 408, referred to as behavior. This process results in the custom datatype 257 having therein the configuration information 265, behavior 260, optionally a UI or API 270, and a link 275 to the custom metadata type. The custom datatype 257 is then packaged for deployment as a deployable and installable package 299 which in turn is installed by developer 410.

Developer 410 creates a new field (at block 425) and then declares the datatype for that new field as the new custom datatype (block 430) which is available to developer 410 via the installed package 299.

At block 435 developer 410 then configures the newly created field as shown at block 435. At block 440 developer 410 then writes application code to reference the field as shown at block 440. By referencing the field at block 440, the field behavior 260, as configured at block 435 will automatically be retrieved. Notably, it is possible to create the application 477 on certain on-demand cloud computing platforms without writing even a single line of code for the application 477. In the example shown here, the only code necessary is behavior 260, thus still permitting a streamlined and simple application 477 development process.

As the creator of the new custom datatype 257, the developer 405 will ultimately provide code for execution to control the behavior 260 of the new custom datatype 257. For instance, such code may read all the fields on an object, to provide a reflection type interface. Reflection type interfaces enable programmers to inspect classes, interfaces, fields and methods at runtime, without knowing the names of the classes, methods, and so forth, at compile time. It is further possible to instantiate new objects, invoke methods and get/set field values using reflection interfaces. Such reflection interfaces are especially helpful in a database system 130 operational environment because parsing of configuration scripts and settings may be deferred to runtime yet still be mapped to method calls on real objects during runtime.

Behavior 260 functionality as provided for the custom datatype 257 may, for instance, identify a field, determining that the field is, for example, declared as an instance of the new custom datatype 257. Such behavior 260 functionality may then responsively request a related custom metadata record and then process the record in accordance with the new custom datatype's 257 provided behavior 260 functionality.

According to described embodiments, developer 405 writes the behavior 260 code and functionality and positions the code as they determine most appropriate as the creator of the new custom datatype 257. For instance, depending on what developer 405 desires the code to perform, the behavior 260 code may be located in a variety of modules or locations. If the new custom datatype 257 requires changes to a user interface, then specialized behavior 260 code may implement a custom mechanism to output to a display certain fields or display objects to be placed onto the user interface within a user interface module or within an appropriate location to interface with such a user interface module. Alternatively, if the new custom datatype 257 requires a specialized trigger on save for an object, such as the roll-up over look-up behavior described previously, then the behavior 260 functionality may be more appropriately located within a class that can be linked, via the custom metadata type, to any object containing fields of the custom datatype.

In a related embodiment, objects which are compliant, compatible, or equivalent to Oracle Object Types may be used to create fields or columns which declare as their datatype the new custom datatype 257 as described herein. Oracle implements certain Objects through the use of types which are defined similar to Oracle packages. Unlike Oracle packages, however, where the instance of the package is limited to the current session, an instance of an Oracle object type may be stored within the database system 130 for later reference.

For example, developer 410 may utilize such an Oracle object type with the new custom datatype 257 created by developer 405. The Oracle object types permit the creation of a class with a group of columns and instructions on what operations are performed for those columns, however, it is not possible to create a specific field capable of injecting additional configuration into the class. Use of a new custom datatype 257 created by developer 405 with an object created by developer 410 permits the definition of a datatype and the creation of a field declared as that datatype and then for any individual field to be populated, the precise form of the configuration may be specified for any field created to make it work, in which a first party, developer 405 who created the new custom datatype 257, specifies the configuration information 265 and further in which a second party, developer 410 who creates a new field declared as the new custom datatype 257, provides the information into that field, as dictated by the configuration information 265 set established by the first party developer 405.

Here the first and second parties 405 and 410 are described as distinct people or different programmers, however, this two step process may be implemented by a single programmer who operates first in the role of the first party, developer 405, and then operates subsequently, after the creation of the new custom datatype 257, as the second party, developer 410.

According to certain embodiments, developers 405 and 410 are different people associated with two different customer organizations. In other embodiments, developers 405 and 410 are the same individual in two different roles or two different developers, but both associated with the same customer organization.

According to described embodiments, developer 405 creates the custom datatype 257 providing the configuration information 265, behavior 260 functionality, optionally the UI or API 270, and the link 275 to the custom metadata type and then packages the custom datatype 257 as a deployable and installable package 299. In such an embodiment, developer 410 in turn installs the deployable and installable package 299, creates a new field, and declares the field as having a datatype corresponding to the new custom datatype 257.

In accordance with a particular embodiment, the deployable and installable package 299 is sold as a product offering providing the new custom datatype 257 to supplement those standard datatypes provided by the host organization's database system 130. In accordance with particular embodiments, developer 410 is a subscriber organization that makes fields having a datatype corresponding to the new custom datatype 257 and developer 405 is a proprietor of the new custom datatype 257 which is provided to the subscriber organizations as the deployable and installable package 299.

In accordance with such an embodiment, the developer 410 of a subscriber organization which receives and installs the deployable and installable package 299 having the new custom datatype 257 therein need not write any code whatsoever to utilize the new custom datatype 257. For instance, a non-programmer user of the database system 130 may create a new field (block 425) via a GUI and declare (block 430) as the field's datatype the new custom datatype 257. For the developer 410, use of the new custom datatype 257 is therefore a purely declarative operation. Developer 410 merely provides the configuration data mandated by the configuration information 265 of the custom datatype 257 as established by developer 405 by populating the newly created field using the UI or API provided by the package (block 435) to complete the declarative operation with the needed information. For instance, such a user acting as the second party developer 410 may create a new column in a table, declare it as the new custom datatype, and then fill out a few pieces of information in a form provided by the UI or API functionality 270 packaged with the deployable and installable package 299. For instance, the UI or API functionality 270 prompts for X, Y, and Z information which is then provided by the developer 410, after which, the field will work as defined and configured, in a pre-defined manner, according to the creator's (first party developer 405) provided behavior 260 functionality.

In such a way, developer 410 is enabled to utilize the standardized datatypes provided by the host organizations' database system 130 which dictate precisely what information is required and how such standardized datatypes are to be used as sanctioned by the host organization's database system implementation 130, but unlikely conventional solutions, developer 410 is additionally enabled to utilize add-on custom datatypes created by developer 405, providing behavior 260 functionality and configuration information beyond that which is approved by and provided by the organization's database system implementation 130.

Importantly, this add-on functionality provided via the custom datatypes 257 by developer 405 are usable by developer 410 without either of the developers 405 and 410 having any access whatsoever to the core database code. The host organization may therefore provide greater extensibility and flexibility to its customer organizations and users without compromising the safety and security of the underlying database system 130, which is critically important in a hosted multi-tenant environment having many distinct users operating within the same computational infrastructure.

Once the new custom datatype 257 is created by developer 405, the process for developer 410 is similar to creating, for instance, a text field. But rather than the text field requesting a length for the text field as its standard configuration information, the developer 405 is enabled to prompt for or require whatever information they consider appropriate for their custom datatype 257 and its defined behavior 260, without being limited to those standardized datatypes already accessible through the database system 130.

According to the described embodiments, the custom metadata type 259 provides the definition for the custom datatype 257. According to a particular embodiment, defining the custom datatype requires the custom metadata type 259 to have already been created as the custom datatype 257 and linked 275 to the custom metadata type 259. For instance, similar to creating a custom object, a custom metadata type 259 is created by giving it a name, specifying fields (e.g., or specifying columns) as the fields to store the configuration data for the custom datatype to be created, with the exception of the relationship field which has fields as its domain such that each record is made to be related to another field rather than being related to, for example, an account. Stated differently, the relationship field causes a record to be related to a column of another object. According to such embodiments, there may be defined any number of relationship fields to relate the record to any number of one or more other columns of another object as specified by the custom metadata type 259.

Once the custom metadata type 259 is established, the custom datatype 257 may then be created. For instance, the host organization may provide a user interface to create custom objects, including, for example, custom datatypes 257.

According to such embodiments, creating the custom datatype 257 requires giving the custom datatype 257 a name, providing a base datatype for the named custom datatype 257 such as a base datatype for free form text but which is treated in a special way via the behavior 260 of the custom datatype 257 or multiple columns, or any other available base datatype selected from the standard datatypes of the database system 130, and then a custom metadata type 259 and a field on that custom metadata type with fields as its domain. Note that the custom metadata type 259 provided to the custom datatype 257 corresponds to the custom metadata type 259 created prior to the creation of the custom datatype 257, though it is conceivable that the custom metadata types 259 could be re-used for more than one custom datatype 257 created. The field on the custom metadata type 259 with fields as its domain is the special field which relates records to another field or column of another object.

Once created, functionality or behavior 260 may be added to the custom datatype to control any conceivable array of behaviors for the custom datatype desired by creator of the custom datatype 257. For instance, the behavior 260 may be provided functionality to control a display layout for the optional UI or API 270 to control how user interface appears to a user declaring the custom datatype as the type for a new field. For instance, the creator of the custom datatype 257 may provide behavior 260 to group a customized set of fields together on a particular part of a display output or, for instance, the above described roll-up over look-up functionality. The creator of the custom datatype 257 may provide behavior 260 to create or allocate a portion of a display screen or display output to specification of parent and child objects for the custom datatype 257 once declared for a field and yet other behavior 260 to specify what operation will be utilized to summarize them (e.g., min, max, average, count, etc.) or filter them, etc., and then yet another part of the display interface to receive user inputs to specify a relationship to another one or more columns of another object.

According to described embodiments, developer 410 utilizes the behavior 260 and functionality of the custom datatype 257 within an application 477 that references the custom datatype once created, packaged, deployed, installed, and declared as the datatype for a given field, as indicated by block 440.

For instance, developer 410 may write application code to evaluate any object passing through by reading the fields of the object and then identifying those fields having a datatype which corresponds to the custom datatype 257 of interest to the developer's 410 application 477. For instance, once the application code identifies a field of an object having been declared as the custom datatype 257, the application code may then query for and read out the appropriate configuration information 265 of the identified custom datatype. Possibly only a subset of the configuration information 265 is needed by the developer's 410 application 477, and as such, the configuration information 265 may be read out and used only in part as relevant to the application's need for that particular field declared as the custom datatype 257.

The objects passing through the developer's 410 application 477 may be standard or custom objects and which is not particularly relevant. What is important to the developer's 410 application 477 is whether or not the objects passing through (e.g., referenced, instantiated, etc.) the developer's 410 application 477 is whether or not any of the objects have a field declared as having a datatype corresponding to the custom datatype 257 of interest, and if so, then the application 477 will identify those fields and retrieve the necessary configuration information for them. Also identified is the special field, the relationship field, which has fields as its domain in which each record is related to some other column or field and some other object.

The retrieved configuration information 265 may be utilized by the developer's 410 application 477 to process the original record and its fields. For instance, the configuration information 265 may provide custom UI code or some other functionality relevant to the custom datatype 257 for processing the object within which it is utilized.

Consider for example the display of fields at a user interface (e.g., a UI or GUI). The host organization provides a default mechanism to display fields associated with any given base datatype, however, the configuration information 265 may nevertheless provide specialized display logic which is then referenced and utilized by the developer's 410 application 477 to display the fields associated with the object in a non-standardized way, different than the default display provided for the base type upon which the custom datatype 257 is built. This display logic is different than the optional UI/API to receive user inputs for the configuration information when a field is declared as a type corresponding to the custom datatype. For instance, take for example a text area as the base type. The developer 405 having created the custom datatype 257 may cause the text area to not be displayed or to be displayed without edit permissions if that text area as utilized by the custom datatype 257 contains sensitive information or other text which is not to be seen or manipulated by the application's end-user.

The specialized display logic provided by the configuration information 265 may alternatively provide the application 477 display arbitrary records or arbitrary objects as specified by the configuration information 265. Alternatively, the specialized display logic provided by the configuration information 265 may provide special processing logic for the fields of the custom datatype such as non-default display, alternative summary processing, etc. Consider for example a base type as a text area which is used to build the custom datatype, however, the custom datatype will instead use the text area to store a URL for an active object. The base type text area, if used without modification, will simply display the text of the URL. This is expected behavior. Although the base type is a text area, the configuration information may provide specialized processing and display logic to, for instance, cause or enable the application 477 to automatically display the URL as an object and provide interface functionality into a GUI displayed to a user client device to display the target of the object identified by the URL rather than merely displaying the text of the URL. Alternatively, a hyperlink corresponding to the URL text could be displayed rather than the target object of the URL, at the preference of developer 405 having created the custom datatype and the developer's 410 application 477 based on the use of the provided configuration information 265.

Another example may be to utilize a text area as a default base type by the custom datatype, however, the configuration information 265 provides display logic to render to a user display the contents of the text area as a drop down pick list rather than a text area according to a default behavior. In yet another embodiment, the custom datatype may utilize the text area as the base type and provide display logic to render the contents as a drop down pick list, however, additional functionality provided by the configuration information of the custom datatype may additionally source the elements of the pick list from a specified source, such as a run-time database query to be executed during run-time of the application 477.

Yet another example would be that of a roll-up field which utilizes a text area as a base type for the custom datatype, however, because it is a roll-up field, its values are deemed to be non-editable as they should instead be calculated, and thus, specialized display logic and processing logic provided by the configuration information of the custom datatype restricts the editability of the text area, but allows it to be displayed, and then provides processing to sum or count or average the contents of the text area according to the behavior 260 provided by the custom datatype and its configuration information which is then utilized by the developer's 410 application 477 at run time. Even if the UI display provides a configuration editor or an editable page, it is nevertheless appropriate to restrict the editability of the roll up field so as to provide an accurate calculation and so as to negate the user from having to manually enter such information. In a similar fashion, masks or field restrictions may be applied at runtime by the application 477 based on the configuration information 265 provided by the custom datatype.

Still other examples of where the application 477 may leverage the behavior 260 functionality and configuration information 265 of the custom datatype 257 are with respect to the save process of an object. Take for example a record insert that occurs during run-time execution of the application 477. If that record is a child then it will look-up its relationship and determine that the parent in that relationship has a field with a datatype requiring a roll-up over look-up. In such a case, the processing logic provided by the behavior 260 functionality and configuration information 265 of the custom datatype 257 will recalculate the roll-up over look-up value for the parent and it will do this every time there is a relevant change to the child which is saved or persisted to the database system 130 via a record update.

Another example usable by the application 477 at runtime is to utilize the behavior 260 functionality and configuration information 265 of the custom datatype 257 to correctly display a computed value for a display field which contains a formula. For instance, it may be that a base type is used to build the custom datatype and within that a text area is utilized to store as its contents a formula, however, at runtime of the application 477, that formula should be evaluated and displayed to a user interface as a resulting calculated value rather than the formula itself. Certain formulas may be indeterminable at the time that an application 477 is written and provisioned onto a system, for instance, if the formula utilizes a date in its calculation, it is necessary for the behavior 260 functionality and configuration information 265 of the custom datatype 257 to pull in real time the necessary elements, such as date and other information, such that a result may be determined at runtime of the application 477 and displayed to a user interface. In such a way, the formula can be stored within the custom datatype's configuration information or behavior without necessitating the constant updating of the custom datatype and without requiring the application 477 developer 410 to provide or code such functionality and instead benefit from the behavior 260 functionality and configuration information 265 of the custom datatype 257.

Such a division of roles between the first developer 405 and the second developer 410 shifts the complexity of programming and coding onto developer 405 who creates the custom datatype and provides the tools and functionality which is deployable as a package 499 to the developer 410 who may be an actual programmer and developer, but may instead be an administrator or an end-user with very little programming knowledge or expertise as their responsibility is not to create the tools provided by the custom datatype, but rather, simply benefit from it when they create a field and declare its type as the custom datatype provided. Developer 410 may be referred to more aptly as a sophisticated "power user" capable of leveraging such tools without having the expertise to necessarily develop them.

At the time of execution within Application 477, any object having the custom datatype declared for a field will query (e.g., via Salesforce Object Query Language (SOQL) or Structured Query Language (SQL) or another query mechanism) the database system 130 to retrieve all the custom metadata records for the object and pull in the configuration information 265 associated with the custom datatype 257 utilized by the object. For instance, the query may utilize a Field ID of the field created and declared as the custom datatype 257. Such query functionality may be provided by developer 405 via a custom object packaged with the deployable and installable package 299. Developer 405 additionally provides the form that the configuration information 265 is to take, even though the actual contents of the configuration information 265 is provided by developer 410 when they create a new field, declare it as the custom datatype and populate the field via the UI or API (refer to blocks 425, 430, and 435). The results of such a query are determined at runtime of the application 477 and are therefore accessible to the application 477 of developer 410.

In such a way, developer 410 may create a new field and declare it as the custom datatype 257 and populate the requested configuration information which will then be retrieved by the application 477 at runtime such that the application 477 executing will then know not only that the field is of the specified custom datatype, but the application 477 will additionally know precisely how it has been configured, because the application 477 queries for such information through the provided behavior 260 functionality and additionally is enabled to perform whatever functionality the custom datatype provides through its behaviors 260. For instance, the application 477 through the custom datatype can read the actual value from the field and read the configuration data and optionally, the application 477 may read configuration data which in turn points the application 477 to other fields in other objects which may then be read to retrieve the values stored in those objects pointed to by the configuration information 265 of the custom datatype 257.

Consider the roll-up over look-up example again. The application 477 may determine that particular field is a field of type roll-up over look-up as established and named via a custom datatype 257 and the application then knows from its configuration data on this particular object, the child data and also what field on a child object is to be summarized. The application 477 additionally knows what is to be summarized for the roll up and how to summarize that data via one or more calculations specified. For instance, the application 477 queries the configuration data which specifies that, for this roll-up summary field, a sum of the amount field on a child object is to be performed but only where any of one or more child objects that satisfy conditions A, B, C, and D. Moreover, the behavior 260 of the custom datatype 257 provides the code by which to perform the exemplary calculated sum as well as the exemplary SOQL or SQL queries on the available child objects to filter out those failing to meet the specified conditions; all of which is returned by the configuration information 265 of the custom datatype.

In such a way, the application 477 at run time simply implements whatever the configuration specifies in terms of the conditions, functional logic, relationships, etc. For instance, such configuration information may be provided via a switch statement with all the possible types of summary operations and how each is to be handled in different ways.

According to one embodiment, the developer 405 who creates the custom datatype is a platform developer and developer 410 who creates the new field and declares it as the custom datatype previously created is an application builder or an application developer responsible for creating application 477.

In practice, developer 410 as an application developer may create a metadata record of the custom metadata type previously created by developer 405 (e.g., at block 406) which then displays a user interface to developer 410 to input the contents of the record based on the UI or API 270 of the custom datatype if developer 405 has elected to provide a form describing and facilitating the entry of such information when the new record is created. Developer 410 as the application developer inputs the requested information into the form which populates the configuration values within the configuration information providing the values for a metadata row or record as part of the creation of the new field declared as the custom datatype. This may be information such as how to summarize for a roll-up field, what the relationships are to other fields, how to filter for or identify child records to be summarized, etc., all of which should be simple for an end-user creating the application because the technically complex programming has already been completed for them by developer 405 as the platform developer.

According to another embodiment, developer 405 creates the custom datatype (block 407) which is linked 275 to the custom metadata type created at block 406, which establishes the format for the configuration information 265 of the custom datatype 257. In accordance with such an embodiment, developer 405 additionally specifies via the configuration information 265 what elements are editable and by whom such elements are editable in terms of permissions, roles, customer organizations, or any other criteria set forth by developer 405. For instance, such editability may be established by permissions and roles, whereas in other instances the editability of information within the configuration information 265 may be determined on the basis of a contractual relationship, such as that between an Independent Software Vendor (ISV) and the developer 405 having created the package which installs the custom datatype or a customer and the developer 405 having created the package which installs the custom datatype in the event the developer 405 is operating as its own ISV. Stated differently, the creator of the custom datatype 405 is able to choose whether subsequent locally installed instances of their custom datatype 405 may be modified, edited, and changed, or if it is restricted in whole or in part from further changes once the deployable and installable package 299 is released publically.

According to a particular embodiment, the editability of the package is controlled by referencing configuration information from a locally installed package back to the database system 130 of the host organization such that additional permissions are required to edit the information which is stored remotely from the locally installed package. Where the deployable and installable package 299 is released publically with full editing permissions, it may be preferable to have the configuration information available locally with the installable package 299 such that it may be changed without requiring further permissions at another remote system such as the database system 130 of the host organization.

According to a particular embodiment, the developer 405 maintains update rights such that they may push an update onto deployed and installed packages 299. For instance, pushing such updates onto already deployed and installed packages 299 may overwrite the defaults of certain specified values established previously by the original installation of the package 299. In such a way, the developer 405 of the custom datatype maintains control for the information specified by the configuration information for the fields created using that custom datatype which enables the developer 405 to update the defaults of the configuration. Notably, however, if a subscriber or other user acting as the application developer 410 has installed such a package and modified values from their defaults, then the push update would alter the default but not revert the changed value established by the customer, user, or application developer 410 back to the default as doing so could damage the application 477 utilizing the custom datatype undermining its value. Stated differently, the developer 405 having created the custom datatype may maintain the right to restrict change to the data and even push updates to the configuration information, but is not provided with a mechanism by which to alter non-default data configurations of an installed package 299.

Figure 5A:
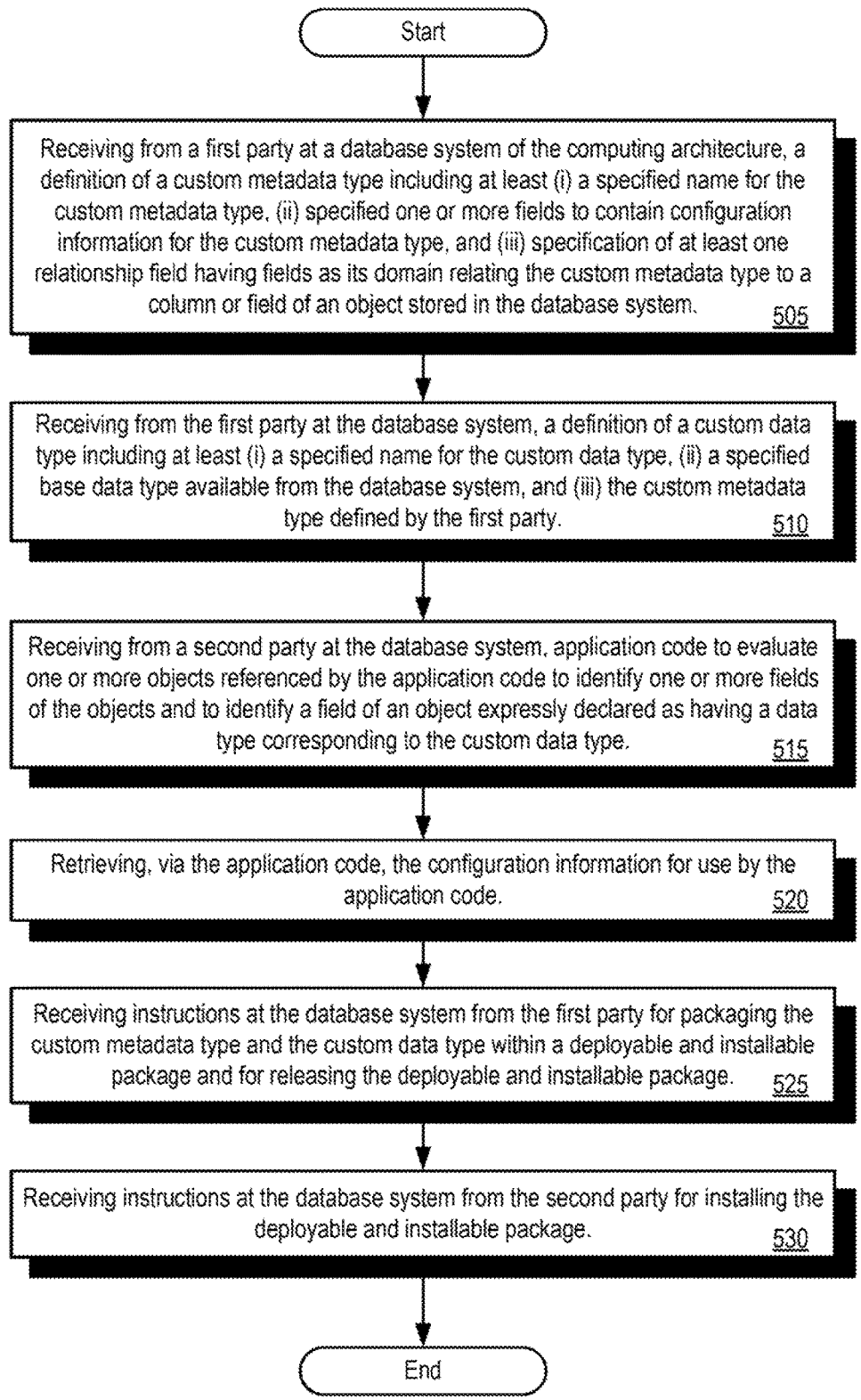
FIGS. 5A and 5B depict flow diagrams illustrating methods for implementing field types which are defined via custom metadata types within a computing environment in accordance with disclosed embodiments.
Figure 5B:
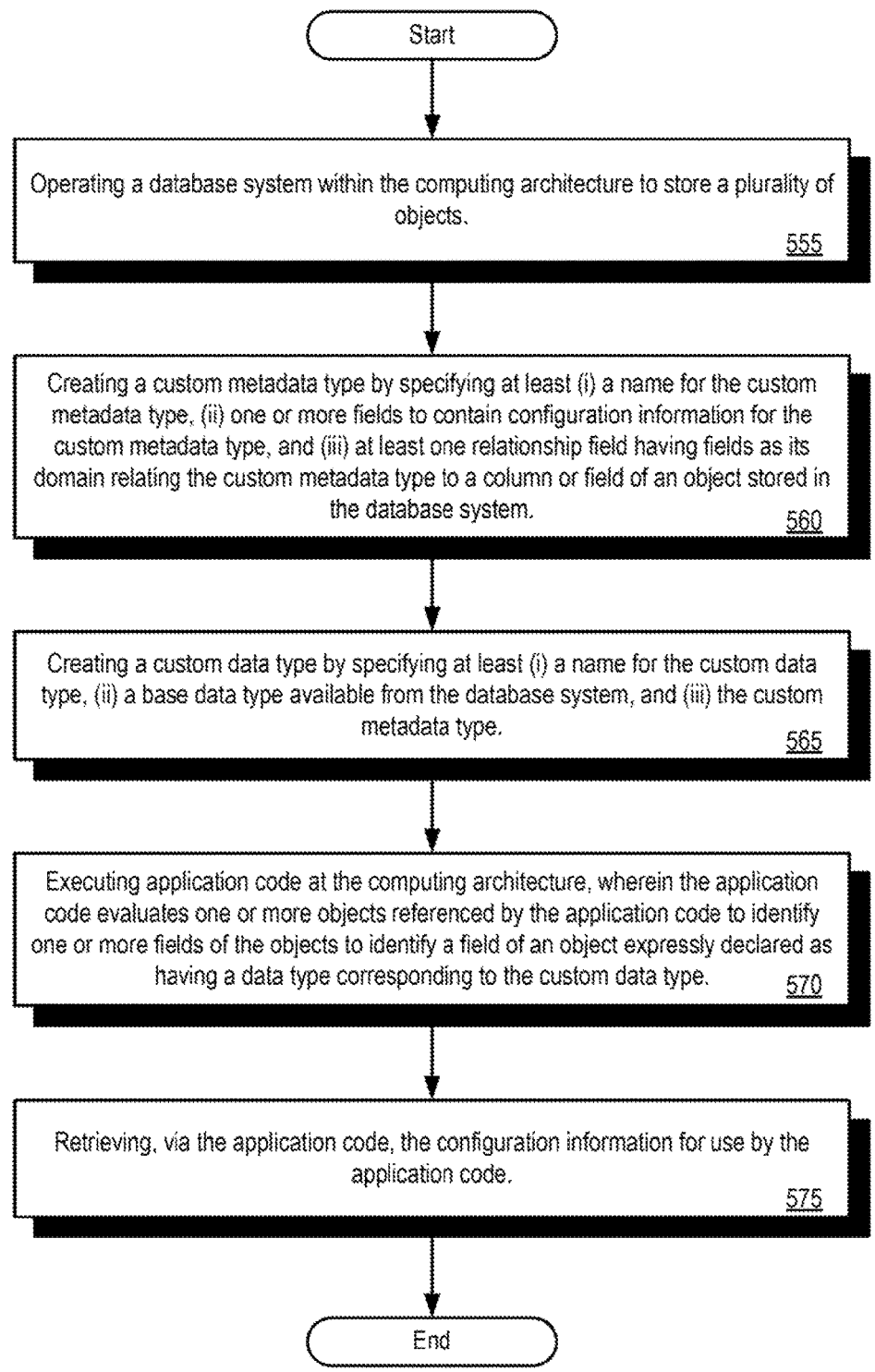

FIGS. 5A and 5B depict flow diagrams illustrating methods 500 and 501 for implementing field types which are defined via custom metadata types within a computing environment in accordance with disclosed embodiments. Methods 500 and 501 may be performed by processing logic that may include hardware (e.g., circuitry, dedicated logic, programmable logic, microcode, etc.), software (e.g., instructions run on a processing device) to perform various operations such as storing, maintaining, receiving, executing, creating, operating, restricting, returning, presenting, interfacing, communicating, transmitting, querying, processing, providing, determining, triggering, displaying, retrieving, updating, sending, etc., in pursuance of the systems and methods as described herein. For example, the hosted computing environment 111 and its database system 130 as depicted at FIG. 1, the database system 130 as depicted at FIGS. 2A and 2B, the computing device 301 at FIG. 3, the system 600 at FIG. 6, the processor system 717 at FIGS. 7A and 7B, or the machine 800 at FIG. 8, may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference first to the method 500 depicted at FIG. 5A, at block 505, processing logic receives from a first party at a database system of the computing architecture, a definition of a custom metadata type including at least (i) a specified name for the custom metadata type, (ii) specified one or more fields to contain configuration information for the custom metadata type, and (iii) specification of at least one relationship field having fields as its domain relating the custom metadata type to a column or field of an object stored in the database system.

At block 510, processing logic receives from the first party at the database system, a definition of a custom datatype including at least (i) a specified name for the custom datatype, (ii) a specified base datatype available from the database system, and (iii) the custom metadata type defined by the first party.

At block 515, processing logic receives from a second party at the database system, application code to evaluate one or more objects referenced by the application code to identify one or more fields of the objects and to identify a field of an object expressly declared as having a datatype corresponding to the custom datatype.

At block 520, processing logic retrieves, via the application code, the configuration information for use by the application code.

At block 525, processing logic receives instructions at the database system from the first party for packaging the custom metadata type and the custom datatype within a deployable and installable package and for releasing the deployable and installable package.

At block 530, processing logic receives instructions at the database system from the second party for installing the deployable and installable package.

According to another embodiment of method 500, receiving, via the application code, the configuration information for use by the application code includes retrieving the configuration information at runtime of the application code, in which the application code issues a query for the configuration information from an object of the database system storing the custom metadata type.

According to another embodiment of method 500, retrieving, via the application code, the configuration information for use by the application code includes the application code querying for custom metadata records associated with the objects referenced by the application code identified as having the field expressly declared as having the datatype corresponding to the custom datatype.

According to another embodiment of method 500, querying for the custom metadata records includes querying for the custom metadata records based on the relationship field specified within the custom metadata type having fields as its domain relating the custom metadata type to the column or field of the object stored in the database system; and retrieving the configuration information from the column or field of the object stored in the database system based on the relationship field of the custom metadata type.

According to another embodiment of method 500, retrieving, via the application code, the configuration information for use by the application code includes the application code querying for custom metadata records using a field ID determined via the application code evaluating the one or more objects referenced by the application code to identify the field of the object expressly declared as having a datatype corresponding to the custom datatype; and retrieving the configuration information from the column or field of the object stored in the database system based on the field ID.

According to another embodiment of method 500, receiving from the first party at a database system of the computing architecture, the definition of the custom metadata type further includes the definition including (iv) behavior functionality stored within the configuration information of the custom metadata type.

According to another embodiment of method 500, retrieving, via the application code, the configuration information for use by the application code includes the application code retrieving the behavior functionality of the custom metadata type with the configuration information and executing the behavior functionality of the custom metadata type within the application code at runtime.

According to another embodiment, method 500 further includes: receiving instructions at the database system from the first party for packaging the custom metadata type and the custom datatype within a deployable and installable package; receiving instructions at the database system from the first party for releasing the deployable and installable package; and receiving instructions at the database system from the second party for installing the deployable and installable package.

According to another embodiment, method 500 further includes: receiving from the second party at the database system, definition of a new field within an object stored by the database system, in which the definition includes at least (i) an express declaration of a datatype for the new field corresponding to the custom datatype and (ii) data inputs from the second party populating the one or more fields containing the configuration information for the custom metadata type stored by a custom metadata record of the custom metadata type.

According to another embodiment of method 500, the application code references the new field within the object stored by the database system.

In accordance with a particular embodiment, there is non-transitory computer readable storage media having instructions stored thereon that, when executed by a processor of a system, the instructions cause the system to perform operations including: receiving from a first party at a database system of the computing architecture, a definition of a custom metadata type including at least (i) a specified name for the custom metadata type, (ii) specified one or more fields to contain configuration information for the custom metadata type, and (iii) specification of at least one relationship field having fields as its domain relating the custom metadata type to a column or field of an object stored in the database system; receiving from the first party at the database system, a definition of a custom datatype including at least (i) a specified name for the custom datatype, (ii) a specified base datatype available from the database system, and (iii) the custom metadata type defined by the first party; receiving from a second party at the database system, application code to evaluate one or more objects referenced by the application code to identify one or more fields of the objects and to identify a field of an object expressly declared as having a datatype corresponding to the custom datatype; and retrieving, via the application code, the configuration information for use by the application code.

With reference next to the method 501 depicted at FIG. 5B, at block 555, processing logic operates a database system within the computing architecture to store a plurality of objects.

At block 560, processing logic creates a custom metadata type by specifying at least (i) a name for the custom metadata type, (ii) one or more fields to contain configuration information for the custom metadata type, and (iii) at least one relationship field having fields as its domain relating the custom metadata type to a column or field of an object stored in the database system.

At block 565, processing logic creates a custom datatype by specifying at least (i) a name for the custom datatype, (ii) a base datatype available from the database system, and (iii) the custom metadata type.

At block 570, processing logic executes application code at the computing architecture, in which the application code evaluates one or more objects referenced by the application code to identify one or more fields of the objects to identify a field of an object expressly declared as having a datatype corresponding to the custom datatype.

At block 575, processing logic retrieves, via the application code, the configuration information for use by the application code.

According to another embodiment, method 501 further includes: storing the custom metadata type within a new object and storing the new object in the database system; and storing the custom datatype within a second new object and storing the second new object in the database system.

According to another embodiment, method 501 further includes: storing a plurality of objects within a database system of the computing architecture, in which each object includes one or more columns or fields, each expressly declared to correspond to exactly one of a plurality of datatypes.

According to another embodiment of method 501, the datatypes are selected from one of a plurality of standard datatypes provided by a developer of the database system having access to core database code used to operate the database system or is selected from one of plurality of custom datatypes added to the database system by a platform developer having access to the database system to create new custom datatypes but lacking access to the core database code used to operate the database system.

According to another embodiment, method 501 further includes: releasing the custom metadata type and the custom datatype within a deployable and installable package; and installing the deployable and installable package.

According to another embodiment of method 501, User Interface (UI) or Application Programming Interface (API) functionality is included with the deployable and installable package for the custom datatype; and in which the method 501 further includes prompting a user, via the UI or API functionality included with the deployable and installable package, for information required by the custom datatype to complete the configuration information upon the creation of a new field declared as having a datatype corresponding to the custom datatype.

According to another embodiment of method 501, behavior functionality is included with the deployable and installable package for the custom datatype.

According to one embodiment, the method 501 further includes: executing, via the application code, the behavior functionality, in which the behavior functionality at least partially controls the display of contents from the one or more objects referenced by the application code at a user interface.

According to another embodiment, the method 501 further includes: executing, via the application code, the behavior functionality, in which the behavior functionality specifies a summary procedure for contents from the one or more objects referenced by the application code at a user interface including specifying one or more of identifying a min, identifying a max, computing an average, computing a count, for the contents of the one or more objects; and in which the summary procedure causes a related object to be updated in the database system based on the summary procedure.

According to another embodiment, the method 501 further includes: via the application code, the behavior functionality, in which the behavior functionality implements non-default editability or display behavior for contents from the one or more objects referenced by the application code at a user interface, or both; and in which the non-default editability or display behavior includes at least one of: restricting edit capability of a text area; restricting display of a text area to a user display; causing URL text within a text area to be displayed as a hyperlink; causing URL text within a text area to retrieve a targeted object specified by the URL and displaying the targeted object to a user display in place of the URL text; causing a formula of a text area to be computed at runtime and displayed as a computed real-time result; causing contents of a text area to be displayed as a drop down list or pick list; and causing contents of a text area to be displayed and calculated without editability permissions by a user at the user display.

According to another embodiment, method 501 further includes: creating a new field in an object; declaring the new field as having a datatype corresponding to the name of the custom datatype; and receiving user data inputs as required according to the configuration information.

According to another embodiment of method 501, the custom datatype or the custom metadata type further provides an API or UI through which any user having declared the custom datatype as the datatype for a field enters requisite data as mandated by the configuration information.

According to another embodiment of method 501, retrieving, via the application code, the configuration information for use by the application code includes the application code executing behavior provided by the custom datatype to retrieve the configuration information.

According to another embodiment of method 501, the base type specifies one of a text area, a numerical field, or a compound multi-column datatype specifying multiple columns each of the multiple columns having an already declared base type.

In accordance with a particular embodiment, there is non-transitory computer readable storage media having instructions stored thereon that, when executed by a processor of a system, the instructions cause the system to perform operations including: operating a database system within the computing architecture to store a plurality of objects; creating a custom metadata type by specifying at least (i) a name for the custom metadata type, (ii) one or more fields to contain configuration information for the custom metadata type, and (iii) at least one relationship field having fields as its domain relating the custom metadata type to a column or field of an object stored in the database system; creating a custom datatype by specifying at least (i) a name for the custom datatype, (ii) a base datatype available from the database system, and (iii) the custom metadata type; executing application code at the computing architecture, in which the application code evaluates one or more objects referenced by the application code to identify one or more fields of the objects to identify a field of an object expressly declared as having a datatype corresponding to the custom datatype; and retrieving, via the application code, the configuration information for use by the application code.

Figure 6:
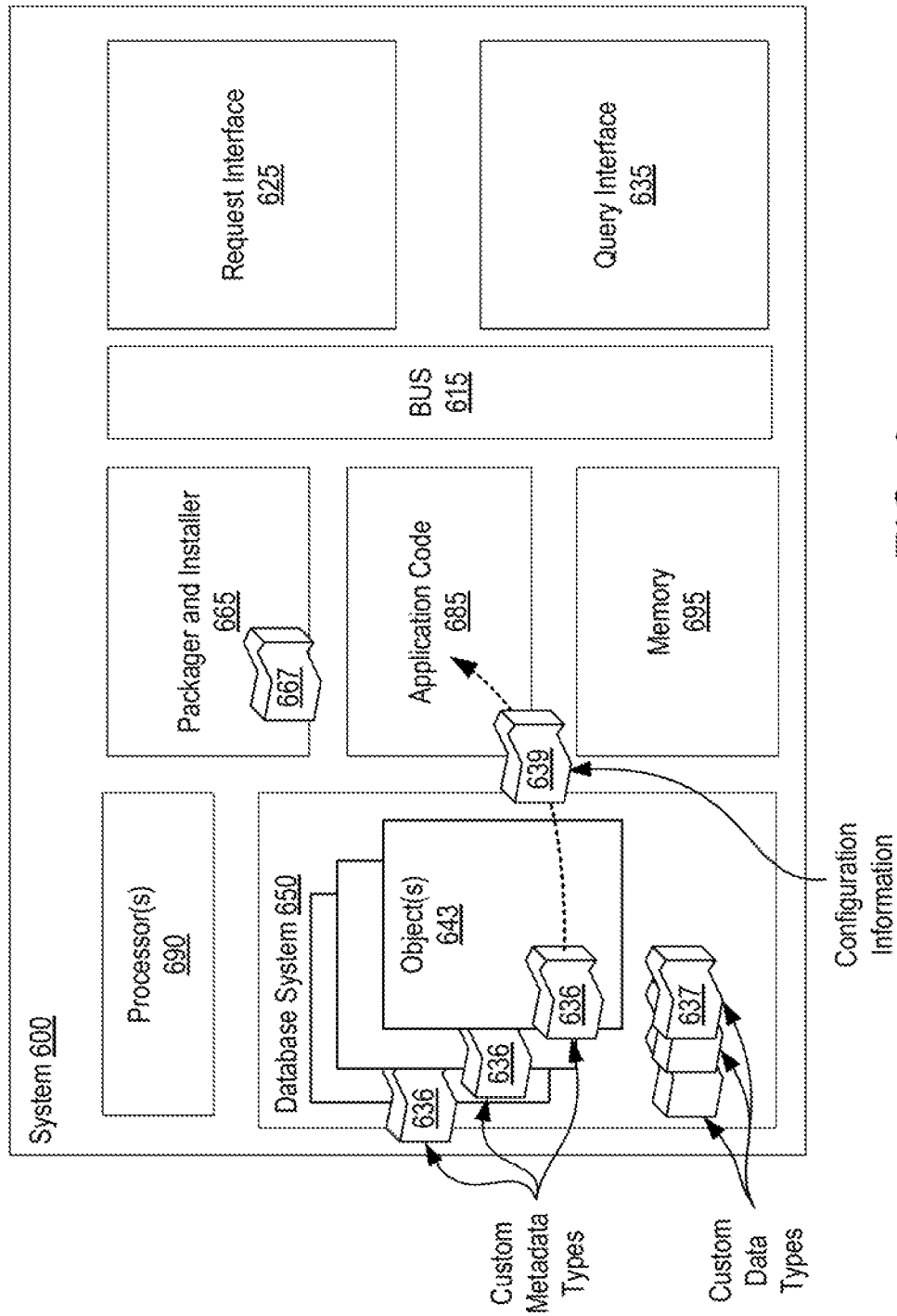
FIG. 6 shows a diagrammatic representation of a system in accordance with which embodiments may operate, be installed, integrated, or configured.

FIG. 6 shows a diagrammatic representation of a system 600 within which embodiments may operate, be installed, integrated, or configured. In accordance with one embodiment, there is a system 600 having at least a processor 690 and a memory 695 therein to execute implementing application code 685. Such a system 600 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 600 includes the processor 690 and the memory 695 to execute instructions at the system 600; a database system 650 to store a plurality of objects 643, each object including one or more columns or fields declared to correspond to exactly one datatype; a custom metadata type 636 defined by a first party of the database system 650, the definition for the custom metadata type 636 including at least (i) a specified name for the custom metadata type, (ii) specified one or more fields to contain configuration information for the custom metadata type, and (iii) specification of at least one relationship field having fields as its domain relating the custom metadata type to a column or field of an object stored in the database system; a custom datatype 637 defined by the first party of the database system, the definition for the custom datatype including at least (i) a specified name for the custom datatype, (ii) a specified base datatype available from the database system, and (iii) the custom metadata type defined by the first party; application code 685 from a second party of the database system 650, the application code 685 to evaluate one or more objects 643 referenced by the application code 685 to identify one or more fields of the objects 643 and to identify a field of an object expressly declared as having a datatype corresponding to the custom datatype; and in which the application code 685 is to retrieve the configuration information 639 for use by the application code 685 at runtime.

According to another embodiment, the system further includes a packager 665 to package and release the custom metadata type 636 and the custom datatype 637 within a deployable and installable package 667 and an installer 665 to install the deployable and installable package 667.

Bus 615 interfaces the various components of the system 600 amongst each other, with any other peripheral(s) of the system 600, and with external components such as external network elements, other machines, client devices, cloud computing services, etc. Communications may further include communicating with external devices via a network interface over a LAN, WAN, or the public Internet.

Figure 7A:
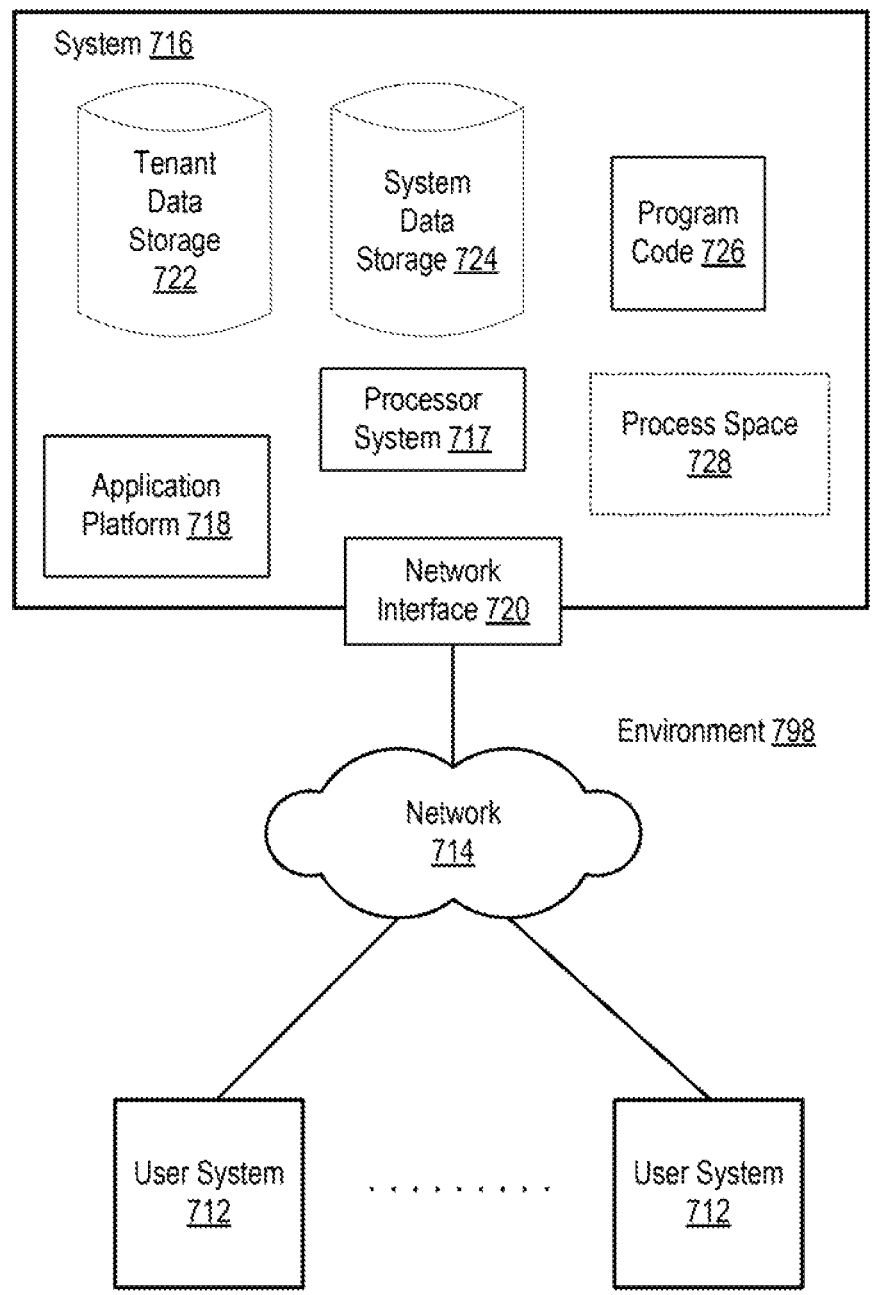
FIG. 7A illustrates a block diagram of an environment in which an on-demand database service may operate in accordance with the described embodiments.

FIG. 7A illustrates a block diagram of an environment 798 in which an on-demand database service may operate in accordance with the described embodiments. Environment 798 may include user systems 712, network 714, system 716, processor system 717, application platform 718, network interface 720, tenant data storage 722, system data storage 724, program code 726, and process space 728. In other embodiments, environment 798 may not have all of the components listed and/or may have other elements instead of, or in addition to, those listed above.

Environment 798 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7A (and in more detail in FIG. 7B) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" is used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7A, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7A, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7A include conventional, well-known elements that are explained only briefly here. For example, each user system 712 may include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units.

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7B:
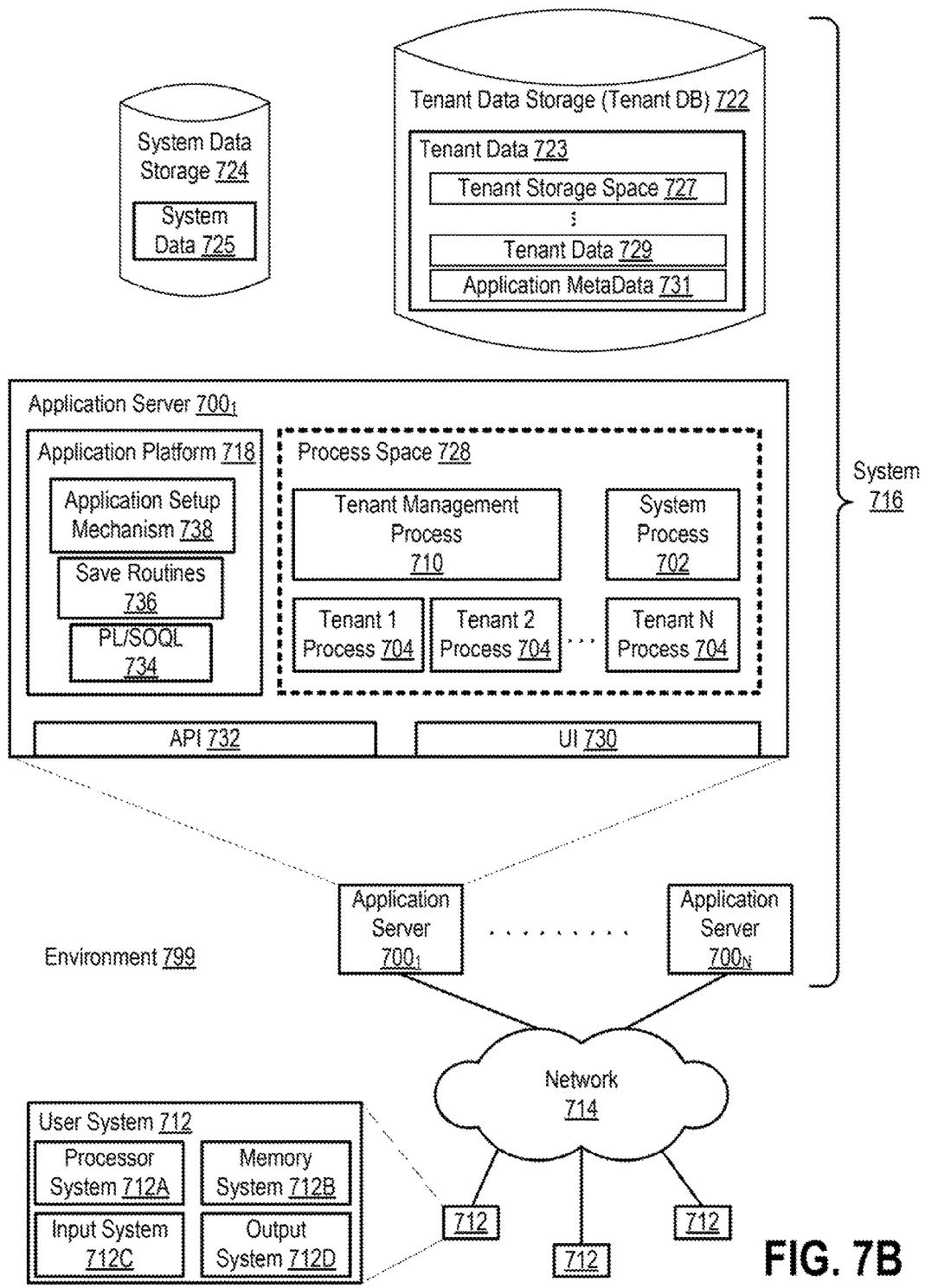
FIG. 7B illustrates another block diagram of an embodiment of elements of FIG. 7A and various possible interconnections between such elements in accordance with the described embodiments.

FIG. 7B illustrates another block diagram of an embodiment of elements of FIG. 7A and various possible interconnections between such elements in accordance with the described embodiments. FIG. 7B also illustrates environment 799. However, in FIG. 7B, the elements of system 716 and various interconnections in an embodiment are illustrated in further detail. More particularly, FIG. 7B shows that user system 712 may include a processor system 712A, memory system 712B, input system 712C, and output system 712D. FIG. 7B shows network 714 and system 716. FIG. 7B also shows that system 716 may include tenant data storage 722, having therein tenant data 723, which includes, for example, tenant storage space 727, tenant data 729, and application metadata 731. System data storage 724 is depicted as having therein system data 725. Further depicted within the expanded detail of application servers $700_{1-N}$ are User Interface (UI) 730, Application Program Interface (API) 732, application platform 718 includes PL/SOQL 734, save routines 736, application setup mechanism 738, process space 728 includes system process space 702, tenant 1-N process spaces 704, and tenant management process space 710. In other embodiments, environment 799 may not have the same elements as those listed above and/or may have other elements instead of, or in addition to, those listed above.

User system 712, network 714, system 716, tenant data storage 722, and system data storage 724 were discussed above in FIG. 7A. As shown by FIG. 7B, system 716 may include a network interface 720 (of FIG. 7A) implemented as a set of HTTP application servers 700, an application platform 718, tenant data storage 722, and system data storage 724. Also shown is system process space 702, including individual tenant process spaces 704 and a tenant management process space 710. Each application server 700 may be configured to tenant data storage 722 and the tenant data 723 therein, and system data storage 724 and the system data 725 therein to serve requests of user systems 712. The tenant data 723 might be divided into individual tenant storage areas (e.g., tenant storage space 727), which can be either a physical arrangement and/or a logical arrangement of data. Within each tenant storage space 727, tenant data 729, and application metadata 731 might be similarly allocated for each user. For example, a copy of a user's most recently used (MRU) items might be stored to tenant data 729. Similarly, a copy of MRU items for an entire organization that is a tenant might be stored to tenant storage space 727. A UI 730 provides a user interface and an API 732 provides an application programmer interface into system 716 resident processes to users and/or developers at user systems 712. The tenant data and the system data may be stored in various databases, such as one or more Oracle™ databases.

Application platform 718 includes an application setup mechanism 738 that supports application developers' creation and management of applications, which may be saved as metadata into tenant data storage 722 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 731 for the subscriber making the invocation and executing the metadata as an application in a virtual machine.

Each application server 700 may be communicably coupled to database systems, e.g., having access to system data 725 and tenant data 723, via a different network connection. For example, one application server $700_1$ might be coupled via the network 714 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 712 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 716 is multi-tenant, in which system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 700 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 8 illustrates a diagrammatic representation of a machine 800 in the exemplary form of a computer system, in accordance with one embodiment, within which a set of instructions, for causing the machine/computer system 800 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database and/or a multi-tenant database implementation), which communicate with each other via a bus 830. Main memory 804 includes custom datatypes 824 and a database 823 to store objects and database tables, and main memory 804 further includes custom metadata 825 in accordance with the embodiments described herein. Main memory 804 and its sub-elements are operable in conjunction with processing logic 826 and processor 802 to perform the methodologies discussed herein.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality which is discussed herein.

The computer system 800 may further include a network interface card 808. The computer system 800 also may include a user interface 810 (such as a video display unit, a liquid crystal display, etc.), an alphanumeric input device 812 (e.g., a keyboard), a cursor control device 814 (e.g., a mouse), and a signal generation device 816 (e.g., an integrated speaker). The computer system 800 may further include peripheral device 836 (e.g., wireless or wired communication devices, memory devices, storage devices, audio processing devices, video processing devices, etc.).

The secondary memory 818 may include a non-transitory machine-readable storage medium or a non-transitory computer readable storage medium or a non-transitory machine-accessible storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface card 808.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A computer-implemented method to execute within a computing architecture having at least a processor and a memory therein to execute instructions, wherein the computer-implemented method comprises:
    operating a database system within the computing architecture to store a plurality of objects;
    creating a custom metadata type by specifying at least (i) a name for the custom metadata type, (ii) one or more fields to contain configuration information for the custom metadata type, and (iii) at least one relationship field having fields as its domain relating the custom metadata type to a column or field of an object stored in the database system;
    creating a custom datatype by specifying at least (i) a name for the custom datatype, (ii) a base datatype available from the database system, and (iii) the custom metadata type;
    releasing the custom metadata type and the custom datatype for installation within a deployable and installable package;
    installing the deployable and installable package, wherein behavior functionality for the custom datatype is included with the deployable and installable package;
    executing application code at the computing architecture, wherein the application code evaluates one or more objects referenced by the application code to identify one or more fields of the objects to identify a field of an object expressly declared as having a datatype corresponding to the custom datatype; and
    retrieving the configuration information for use by the application code and executing, via the application code, the behavior functionality, wherein the behavior functionality specifies a summary procedure for contents from the one or more objects referenced by the application code at a user interface, wherein the summary procedure specifies one or more of: (i) identifying a min, (ii) identifying a max, (iii) computing an average, and (iv) computing a count, for the contents of the one or more objects and further wherein the summary procedure causes a related object to be updated in the database system based on the summary procedure.

2. The computer-implemented method of claim 1, further comprising:
    storing the custom metadata type within a new object and storing the new object in the database system; and storing the custom datatype within a second new object and storing the second new object in the database system.

3. The computer-implemented method of claim 1, further comprising:
storing a plurality of objects within a database system of the computing architecture, wherein each object includes one or more columns or fields, each expressly declared to correspond to exactly one of a plurality of datatypes;
wherein the datatypes are selected from one of a plurality of standard datatypes provided by a developer of the database system having access to core database code used to operate the database system or is selected from one of plurality of custom datatypes added to the database system by a platform developer having access to the database system to create new custom datatypes but lacking access to the core database code used to operate the database system.

4. The computer-implemented method of claim 1:
wherein User Interface (UI) or Application Programming Interface (API) functionality is included with the deployable and installable package for the custom datatype; and
wherein the computer-implemented method further comprises:
prompting a user, via the UI or API functionality included with the deployable and installable package, for information required by the custom datatype to complete the configuration information upon the creation of a new field declared as having a datatype corresponding to the custom datatype.

5. The computer-implemented method of claim 1:
wherein behavior functionality is included with the deployable and installable package for the custom datatype; and
wherein the computer-implemented method further comprises:
executing, via the application code, the behavior functionality, wherein the behavior functionality at least partially controls the display of contents from the one or more objects referenced by the application code at a user interface.

6. The computer-implemented method claim 1:
wherein behavior functionality is included with the deployable and installable package for the custom datatype; and
wherein the computer-implemented method further comprises:
executing, via the application code, the behavior functionality, wherein the behavior functionality implements non-default editability or display behavior for contents from the one or more objects referenced by the application code at a user interface, or both; and
wherein the non-default editability or display behavior includes at least one of:
restricting edit capability of a text area;
restricting display of a text area to a user display;
causing URL text within a text area to be displayed as a hyperlink;
causing URL text within a text area to retrieve a targeted object specified by the URL and displaying the targeted object to a user display in place of the URL text;
causing a formula of a text area to be computed at runtime and displayed as a computed real-time result;
causing contents of a text area to be displayed as a drop down list or pick list; and
causing contents of a text area to be displayed and calculated without editability permissions by a user at the user display.

7. The computer-implemented method of claim 1, further comprising:
creating a new field in an object;
declaring the new field as having a datatype corresponding to the name of the custom datatype; and
receiving user data inputs as required according to the configuration information.

8. The computer-implemented method of claim 1, wherein the custom datatype or the custom metadata type further provides an API or UI through which any user having declared the custom datatype as the datatype for a field enters requisite data as mandated by the configuration information.

9. The computer-implemented method of claim 1, wherein retrieving, via the application code, the configuration information for use by the application code comprises the application code executing behavior provided by the custom datatype to retrieve the configuration information.

10. The computer-implemented method of claim 1, wherein the base type specifies one of a text area, a numerical field, or a compound multi-column datatype specifying multiple columns each of the multiple columns having an already declared base type.

11. The computer-implemented method of claim 1:
wherein retrieving the configuration information for use by the application code comprises retrieving the configuration information via the application code at runtime of the application code by issuing a query for the configuration information from an object of the database system storing the custom metadata type.

12. The computer-implemented method of claim 1:
wherein retrieving the configuration information for use by the application code comprises the application code querying for custom metadata records associated with the objects referenced by the application code identified as having the field expressly declared as having the datatype corresponding to the custom datatype.

13. The computer-implemented method of claim 12:
wherein querying for the custom metadata records comprises querying for the custom metadata records based on the relationship field specified within the custom metadata type having fields as its domain relating the custom metadata type to the column or field of the object stored in the database system; and
retrieving the configuration information from the column or field of the object stored in the database system based on the relationship field of the custom metadata type.

14. The computer-implemented method of claim 1, wherein retrieving the configuration information for use by the application code comprises:
querying for custom metadata records from the application code using a field ID determined by the application code by evaluating the one or more objects referenced by the application code to identify the field of the object expressly declared as having a datatype corresponding to the custom datatype; and
retrieving the configuration information from the column or field of the object stored in the database system based on the field ID.

15. Non-transitory computer readable storage media having instructions stored thereon that, when executed by a processor of a system, the instructions cause the system to perform operations including:

operating a database system within the computing architecture to store a plurality of objects;
creating a custom metadata type by specifying at least (i) a name for the custom metadata type, (ii) one or more fields to contain configuration information for the custom metadata type, and (iii) at least one relationship field having fields as its domain relating the custom metadata type to a column or field of an object stored in the database system;
creating a custom datatype by specifying at least (i) a name for the custom datatype, (ii) a base datatype available from the database system, and (iii) the custom metadata type;
releasing the custom metadata type and the custom datatype for installation within a deployable and installable package;
installing the deployable and installable package, wherein behavior functionality for the custom datatype is included with the deployable and installable package;
executing application code at the computing architecture, wherein the application code evaluates one or more objects referenced by the application code to identify one or more fields of the objects to identify a field of an object expressly declared as having a datatype corresponding to the custom datatype; and
retrieving the configuration information for use by the application code and executing, via the application code, the behavior functionality, wherein the behavior functionality specifies a summary procedure for contents from the one or more objects referenced by the application code at a user interface, wherein the summary procedure specifies one or more of: (i) identifying a min, (ii) identifying a max, (iii) computing an average, and (iv) computing a count, for the contents of the one or more objects and further wherein the summary procedure causes a related object to be updated in the database system based on the summary procedure.

16. The non-transitory computer readable storage media of claim 15, wherein the instructions, when executed by the processor of the system, cause the system to perform operations further comprising:
receiving instructions at the database system from the first party for packaging the custom metadata type and the custom datatype within a deployable and installable package;
receiving instructions at the database system from the first party for releasing the deployable and installable package; and
receiving instructions at the database system from the second party for installing the deployable and installable package.

17. A system comprising a processor and a memory to execute instructions at the system, wherein the instructions cause the system to execute operations including:
operating a database system within the system to store a plurality of objects;
creating a custom metadata type by specifying at least (i) a name for the custom metadata type, (ii) one or more fields to contain configuration information for the custom metadata type, and (iii) at least one relationship field having fields as its domain relating the custom metadata type to a column or field of an object stored in the database system;
creating a custom datatype by specifying at least (i) a name for the custom datatype, (ii) a base datatype available from the database system, and (iii) the custom metadata type;
releasing the custom metadata type and the custom datatype for installation within a deployable and installable package;
installing the deployable and installable package, wherein behavior functionality for the custom datatype is included with the deployable and installable package;
executing application code at the system, wherein the application code evaluates one or more objects referenced by the application code to identify one or more fields of the objects to identify a field of an object expressly declared as having a datatype corresponding to the custom datatype; and
retrieving the configuration information for use by the application code and executing, via the application code, the behavior functionality, wherein the behavior functionality specifies a summary procedure for contents from the one or more objects referenced by the application code at a user interface, wherein the summary procedure specifies one or more of: (i) identifying a min, (ii) identifying a max, (iii) computing an average, and (iv) computing a count, for the contents of the one or more objects and further wherein the summary procedure causes a related object to be updated in the database system based on the summary procedure.

18. The system of claim 17, further comprising:
a packager to execute via the processor of the system pursuant to the instructions, wherein the packager is to package and release the custom metadata type and the custom datatype within the deployable and installable package; and
an installer to execute via the processor of the system pursuant to the instructions, wherein the installer is to install the deployable and installable package.

19. A computer-implemented method to execute within a computing architecture having at least a processor and a memory therein to execute instructions, wherein the computer-implemented method comprises:
operating a database system within the computing architecture to store a plurality of objects;
receiving from a first party at the database system of the computing architecture, a definition of a custom metadata type specifying at least (i) a name for the custom metadata type, (ii) one or more fields to contain configuration information for the custom metadata type, and (iii) at least one relationship field having fields as its domain relating the custom metadata type to a column or field of an object stored in the database system;
receiving from the first party at the database system, a definition of a custom datatype specifying at least (i) a name for the custom datatype, (ii) a base datatype available from the database system, and (iii) the custom metadata type as defined by the first party;
releasing the custom metadata type and the custom datatype for installation within a deployable and installable package;
installing the deployable and installable package, wherein behavior functionality for the custom datatype is included with the deployable and installable package;
receiving from a second party at the database system, application code to evaluate one or more objects referenced by the application code to identify one or more fields of the objects and to identify a field of an object expressly declared as having a datatype corresponding to the custom datatype; and
retrieving the configuration information for use by the application code and executing, via the application code, the behavior functionality, wherein the behavior functionality specifies a summary procedure for contents from the one or more objects referenced by the application code at a user interface, wherein the summary procedure specifies one or more of: (i) identifying a min, (ii) identifying a max, (iii) computing an average, and (iv) computing a count, for the contents of the one or more objects and further wherein the summary procedure causes a related object to be updated in the database system based on the summary procedure.

20. The computer-implemented method of claim 19, wherein retrieving, via the application code, the configuration information for use by the application code comprises retrieving the configuration information at runtime of the application code, wherein the application code issues a query for the configuration information from an object of the database system storing the custom metadata type.

21. The computer-implemented method of claim 19:
wherein receiving from the first party at a database system of the computing architecture, the definition of the custom metadata type further comprises the definition including (iv) behavior functionality stored within the configuration information of the custom metadata type; and
wherein retrieving, via the application code, the configuration information for use by the application code comprises the application code retrieving the behavior functionality of the custom metadata type with the configuration information and executing the behavior functionality of the custom metadata type within the application code at runtime.

22. The computer-implemented method of claim 19, further comprising:
receiving instructions at the database system from the first party for packaging the custom metadata type and the custom datatype within a deployable and installable package;
receiving instructions at the database system from the first party for releasing the deployable and installable package; and
receiving instructions at the database system from the second party for installing the deployable and installable package.

23. The computer-implemented method of claim 19, further comprising:
receiving from the second party at the database system, definition of a new field within an object stored by the database system, wherein the definition includes at least (i) an express declaration of a datatype for the new field corresponding to the custom datatype and (ii) data inputs from the second party populating the one or more fields containing the configuration information for the custom metadata type stored by a custom metadata record of the custom metadata type.

24. The computer-implemented method of claim 23, wherein the application code references the new field within the object stored by the database system.

* * * * *